United States Patent [19]

Georgis et al.

[11] Patent Number: 5,050,018

[45] Date of Patent: Sep. 17, 1991

[54] APPARATUS AND METHOD FOR READING HELICALLY RECORDED TRACKS AND REREADING TRACKS AS NECESSARY

[75] Inventors: Steven P. Georgis, Boulder; E. Christopher Pisciotta, Louisville, both of Colo.

[73] Assignee: Exabyte Corporation, Boulder, Colo.

[21] Appl. No.: 511,312

[22] Filed: Apr. 19, 1990

[51] Int. Cl.$^5$ .................. G11B 5/588; G11B 5/09; G11B 15/20

[52] U.S. Cl. .................. 360/77.16; 360/32; 360/53; 360/74.4

[58] Field of Search .................. 360/18, 27, 32, 38.1, 360/47, 53, 54, 70, 74.1, 74.4, 75, 76, 77.13–77.16

[56] References Cited

U.S. PATENT DOCUMENTS

| | | | |
|---|---|---|---|
| 4,099,211 | 7/1978 | Hathaway | 360/109 |
| 4,106,065 | 8/1978 | Ravizza | 360/109 |
| 4,172,265 | 10/1979 | Sakamoto et al. | 360/70 |
| 4,404,605 | 9/1983 | Sakamoto | 360/77.13 |
| 4,420,778 | 12/1983 | Sakamoto | 360/77.13 |
| 4,486,796 | 12/1984 | Sakamoto | 360/77.13 |
| 4,492,991 | 1/1985 | Osada et al. | 360/74.4 |
| 4,835,628 | 5/1989 | Hinz et al. | 360/48 |
| 4,843,495 | 6/1989 | Georgis et al. | 560/77.15 |
| 4,845,577 | 7/1989 | Georgis et al. | 360/72.2 |

Primary Examiner—Aristotelis Psitos
Assistant Examiner—Steven R. Garland
Attorney, Agent, or Firm—Griffin Branigan & Butler

[57] ABSTRACT

A helical drive system (10) reads tracks (18) on a storage medium (12), including tracks which appear as distorted tracks. Each track (18) comprises a plurality of blocks of data, with each block having unique block-identifying information. A track-following servo system (84) causes a read head (16C) to traverse predetermined original azimuthal paths (P0) across the storage medium (12) for reading the blocks recorded along each of the original azimuthal paths (P0). A controller (50) uses the block-identifying information to determine whether any blocks expected to be read during the traversal of the original azimuthal paths (P0) were not read. If expected blocks were not read, the controller (50) repositions the storage medium (12) and directs that the medium (12) be re-read with the head (16C) positionally offset until the expected blocks are actually read. During the re-read attempts, the read head (16C) is positionally offset to traverse sets of modified azimuthal paths (P1, P2, P3, . . . P10). Each set of modified azimuthal paths (P2, P3, . . . P10) is offset with respect to the original azimuthal paths (P0) relative to a direction of medium travel (15), thereby providing opportunities to read blocks which would not otherwise be read due to distortion of the tracks (18). In one mode of the invention, the controller (50) dynamically selects from among a plurality of offset degree values based on the historical success rate of the differing offsets in reading blocks which formerly were missing blocks.

34 Claims, 10 Drawing Sheets

APPARATUS AND METHOD FOR READING HELICALLY RECORDED TRACKS AND REREADING TRACKS AS NECESSARY

BACKGROUND

1. Field of Invention

This invention pertains to apparatus and method for reading helically recorded magnetic tape, and particularly to apparatus and method for recovery from errors that occur when reading helically recorded magnetic tape having distorted tracks.

2. Prior Art and Other Considerations

In accordance with helical scan recording technology, magnetically reproducible signals are recorded on magnetic storage media in the form of parallel tracks or stripes. It is well known that operational problems may cause one or more tracks of information, helically recorded on magnetic tape storage media, to appear upon playback or reading as a distorted track.

One type of distorted track is a curved track. In this respect, problems such as those associated with the handling or guiding of a magnetic tape as it is being read may cause a track to appear as a curved track.

Various prior art schemes have been developed to compensate for the reading of curved tracks. These schemes primarily enable a track-reading head or transducer to follow the curvature of the track. Typically this is done by mounting the track-reading head upon an element (such as a bi-morph leaf) that can be deflected to permit the head to follow the curved track.

The prior art schemes described above generally require that the track be formatted upon recording to include not only the stored data information, but also a special tracking or servo signal which must be continuously or periodically recorded along the length of the track. Examples of such schemes are provided in U.S. Pat. No. 4,486,796 to Sakamoto; U.S. Pat. No. 4,420,778 to Sakamoto; U.S. Pat. No. 4,404,605 to Sakamoto; U.S. Pat. No. 4,172,265 to Sakamoto et al.; U.S. Pat. No. 4,099,211 to Hathaway; and, U.S. Pat. No. 4,106,065 to Ravizza.

However, not all helical scan recording systems provide a continuous or periodic tracking or servo signal along the length of a track. For example, U.S. Pat. No. 4,843,495 to Georgis et al. (entitled CYCLICAL SERVO ZONE TRACKING METHOD AND APPARATUS FOR HELICAL SCAN RECORDING DEVICES), commonly assigned herewith and incorporated by reference herein, describes a servo technique implemented on an EXB-8200 helical tape drive manufactured by Exabyte Corporation. That servo technique involves the recording of a servo signal essentially only at the beginning of each track. Accordingly, the prior art schemes for attempting to read curved tracks are not suitable for this particular servo technique.

Downtrack from the servo signal area, the prior art EXB-8200 helical tape drive records informational data in a blocked format, with eight data blocks being recorded per track or stripe. Advantageously, the blocks need not necessarily be recorded nor read in any order, as explained in U.S. patent application Ser. No. 07/069,132 filed July 2, 1987, entitled METHOD APPARATUS FOR DATA BUFFER MANAGEMENT, commonly assigned herewith and incorporated herein by reference.

In the above regard, the magnetic tape read by the EXB-8200 is formatted so that every data block has a header portion that includes block-identifying information. Upon reading of a block, a micro-controller stores the data contents of the block in a data buffer and the block-identifying information into an allocation table. Using the block-identifying information stored in the allocation table, the micro-controller ascertains the order for utilizing the corresponding data blocks stored in the data buffer.

If a search of the allocation table of the EXB-8200 indicates that a block is missing, as might occur during a curved track read condition, the microcontroller would request re-reading of the tape in hopes that the missing block would be detected and read upon re-read. However, during re-read the read head would follow essentially the same path as during the initial read, with the result that a block on a curved track that evaded discovery during an initial read attempt could also be evasive during subsequent read attempts.

In addition to curved tracks, other types of distortions to the ideal track geometry may be present when a tape is read. These distortions may be the result of the data write operation, the read operation, or both. Some examples of these distortions are listed below:

(a) Track pitch distortions caused during the recording process by fluctuating tape speed or abnormal splice operations.

(b) Track angle variations caused by tape guide misalignment or by the use of tape having worn or damaged edges. This could effect both the data write and read operations.

(c) Interchange between two data recorders having incompatible tape guide adjustments. This could result in combinations of track angle and track curvature problems during the data read process.

(d) Other types of distortion could result from contaminants becoming deposited on the tape after the data was recorded. The presence of the contaminant could alter the way in which the read head follows the recorded track.

Accordingly, it is an object of the present invention to provide method and apparatus for reading helically recorded tracks, even when the tracks are distorted.

An advantage of the present invention is the provision of method and apparatus that facilitates the reading of distorted tracks, such as curved tracks, when tracking or servo information is not provided continuously or periodically along the tracks.

SUMMARY

A helical drive system according to the present invention reads tracks recorded on a storage medium, including tracks which appear as distorted tracks. Each track comprises a plurality of blocks of recorded data, with each block having unique block-identifying information provided in a block header.

The drive system includes a read head positioned on a rotatable drum which contacts the storage medium in such a manner that the read head traverses predetermined original azimuthal paths across the storage medium for reading blocks recorded along each of the original azimuthal paths. The original azimuthal paths are straight paths.

As each block is read, the block-identifying information is stripped from the block header. Non-header portions of the block, known as block "user data" or the "user block" are stored in a data buffer. The block-identifying information for each user block loaded into the data buffer is stored in an allocation table. One of such block-identifying parameters is known as BLOCK ID. The allocation table thereby essentially serves as a directory for listing the BLOCK IDs for the user blocks stored in the data buffer.

Blocks stored in the data buffer are made available to a user or utilization device, such as a host computer system. The utilization device requests additional blocks from the data buffer as needed, and expects to receive the blocks in predetermined order according to a monotonic increasing series of BLOCK ID values. When a request is received from the utilization device, a controller included in the helical drive system determines, by consulting the allocation table, whether a block having the next BLOCK ID is stored in the data buffer. If the sought BLOCK ID value is located in the allocation table, the corresponding block is transmitted from the data buffer to the utilization device.

If the sought BLOCK ID value is not located in the allocation table, in one mode of the invention the controller executes a loop known as the OFFSET READ LOOP. During execution of the OFFSET READ LOOP, the storage medium is re-positioned (e.g., re-wound) in preparation for a re-reading of a portion of the storage medium. Prior to the re-reading, however, the controller determines a modified azimuthal path to be followed by the read head. The modified azimuthal path is essentially parallel to the original azimuthal path travelled by the read head, but may be laterally offset or displaced from the original azimuthal path with respect to the direction of tape travel. The amount of the read head displacement relative to the original azimuthal path is known as the offset degree value or offset degree. The amount of the offset or displacement depends on the number of times the loop has been executed (as stored in a counter OFFSET LOOP COUNTER).

During each execution of the OFFSET READ LOOP, the storage medium is re-read with the head travelling the modified azimuthal path. After each execution of the OFFSET READ LOOP, a determination is made whether the previously missing block(s) were read during the most recent execution. If any missing block(s) were read, the block-identifying information is stored in the allocation table and the user block is stored in the data buffer. If any previously missing block has yet to be located, the OFFSET READ LOOP is again executed, with the controller choosing a different offset value for the next execution of the OFFSET READ LOOP.

When all formerly missing blocks are successfully read, the read head remains positioned with the last offset degree value for further reading of the tape. If this last offset degree value ultimately results in holes in the allocation table during subsequent read operations, the read head returns to a zero offset during a first execution of the OFFSET READ LOOP.

During the first execution of the OFFSET READ LOOP, the offset selected by the controller is zero. During the second execution, the offset is the maximum displacement in a negative directional sense from the original azimuthal path. During a second execution, the offset is the maximum displacement in a positive directional sense from the original azimuthal path. The subsequent executions, or "retries", are binary search divisions, ending finally, in the offset magnitude being restored to zero. If, after ten retries, the missing blocks still cannot be read, a permanent read error is generated.

In another mode of the invention, a controller executes a DYNAMIC OFFSET READ LOOP to select from a plurality of possible offset degree values based on the historical success rate of the offset degree values in reading missing blocks. In this dynamic mode of the invention, a utilization sequence of the non-zero offset degree values is periodically re-ordered based on the value of success counters associated with the corresponding offset degree values. The success counters tabulate the number of formerly missing blocks successfully read with the associated head offset degree value. The offset degree values are stored in RAM memory, thereby facilitating the rearrangement of the utilization sequence. The rearrangement or reordering results in the usage of offset degree values in an order of likelihood of success of reading missing blocks.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
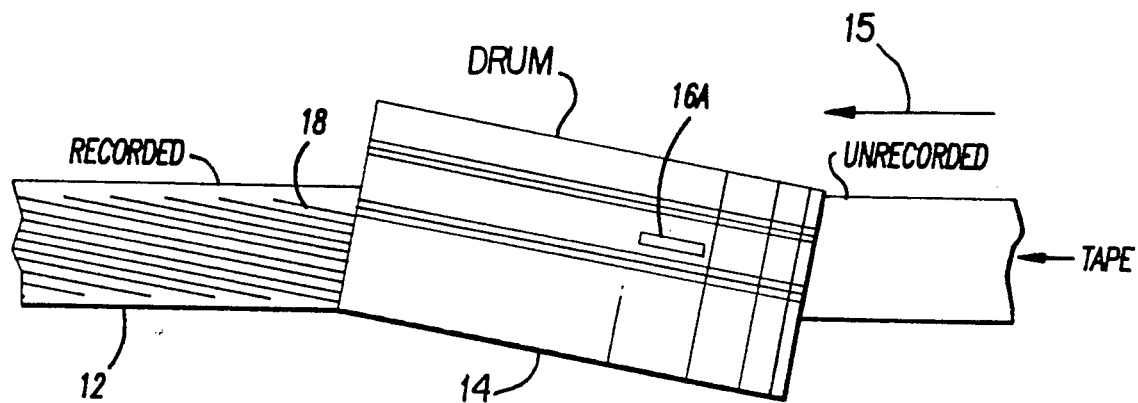
FIG. 1 is a schematic illustration of recording on magnetic tape by tracks using a helical scan recording arrangement.
Figure 2:
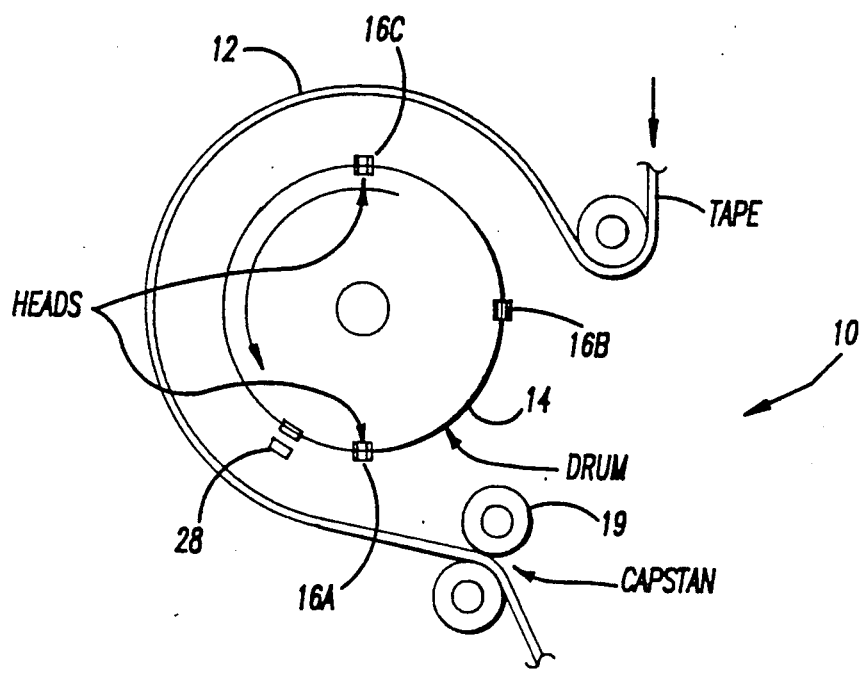
FIG. 2 is a schematic illustration of magnetic head placement on a rotatable drum for helical scan recording on magnetic tape according to an embodiment of the invention.

A helical-scan drive system 10 for recording on and reading magnetic tape 12 is illustrated in FIGS. 1 and 2. A drum 14 is angularly oriented with respect to the edges and direction of travel 15 of magnetic tape 12. As indicated in FIG. 2, drum 14 has heads 16A, 16B, and 16C mounted thereon to establish a physical relation between the heads on the drum 14 and the tape 12. Head 16A is a write (or recording head); head 16B is a servo head; and, head 16C is a read (or playback) head.

By the illustrated arrangement, data is recorded on the tape 12 at an angle with respect to the direction of travel 15 of the tape 12, and hence, as indicated in FIG. 1, is recorded as discrete tracks or stripes 18 when the drum is rotated at a high speed relative to the speed of the tape 12. As indicated in FIG. 2, the tape is preferably moved at a rate of 10.89 millimeters per second while the drum is rotated at 1800 rpm, the tape speed being controlled by the rotational speed of capstan 19. It is to be realized, however, that the operating speeds as set forth are by way of example and the invention is not meant to be limited thereto.

Figure 3:
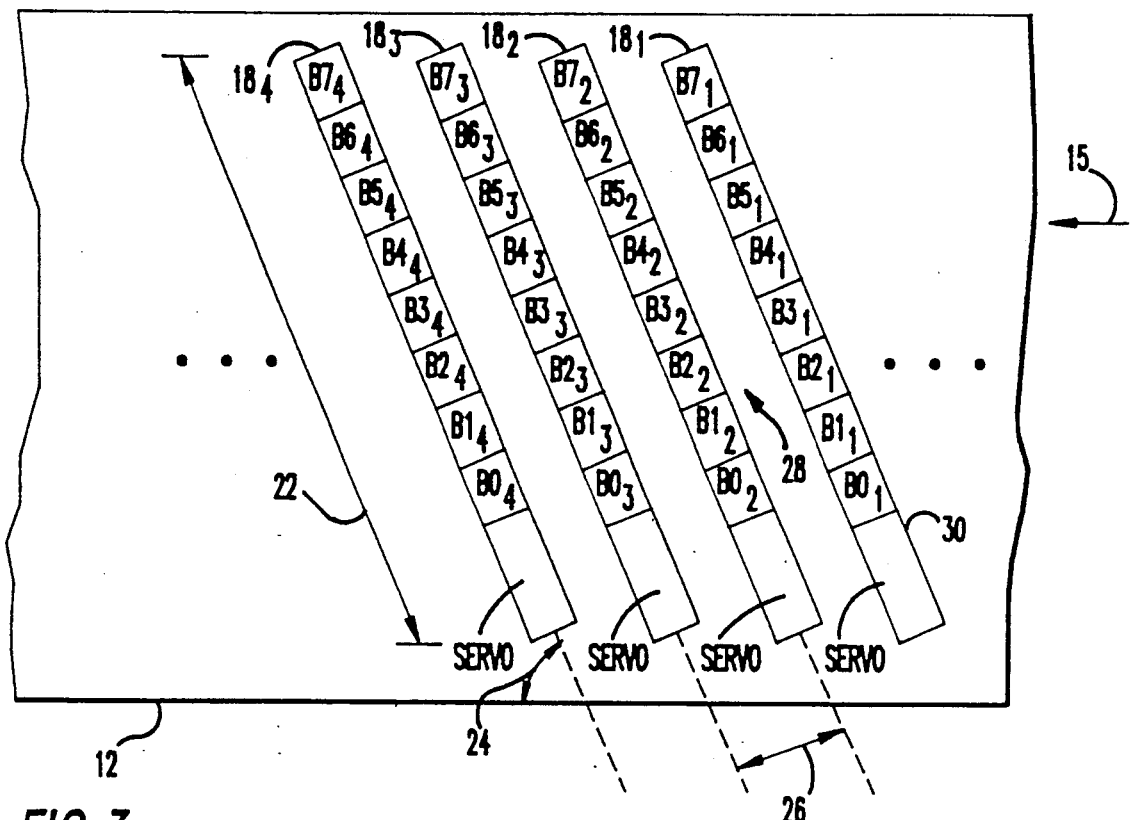
FIG. 3 is a schematic illustration of helical tracks properly recorded on magnetic tape, and a particular format thereof.

FIG. 3 shows a plurality of discrete tracks $18_1$, $18_2$, $18_3$, and $18_4$ properly recorded on tape 15. Being properly recorded, each of the tracks 18 extends in a straight line for a predetermined length (depicted by line 22) at an a angle 24 (also known as a "track angle" or "stripe angle") relative to the direction of tape travel (indicated by arrow 15). The centerlines of adjacent tracks are separated by a track pitch, represented by reference numeral 26 in FIG. 3. The tracks are separated by inter-track guard bands 28. In the illustrated embodiment, the a angle 24 is on the order of 4.9 degrees; the track pitch is on the order of 31 micrometers.

FIG. 3 also shows a format of tape 12 usable with the present invention. The tape 12 is block oriented, with eight data blocks $B0_x$, $B2_x$, ... $B7_x$ being provided per track 18, tracks x = 1, 2, ... 4 being shown in FIG. 3 as previously stated. Each block is a complete and independent entity which can be read independently of any other data blocks. For an example of the format of each data block, see U.S. Pat. No. 4,835,628 entitled APPARATUS AND METHOD FOR FORMATTING AND RECORDING DIGITAL DATA ON MAGNETIC TAPE, which is commonly assigned herewith and incorporated by reference herein.

With regard to format, each data block contains certain header information, including a BLOCK ID and PHYSICAL BLOCK ID, the combination of which is unique for each block. As used hereinafter, "user data" and "user block" refer to the non-header portion of each block which is ultimately transmitted to a utilization device, such as a host computer.

In addition to containing the eight data blocks, each track 18 contains near its beginning (i.e., before the data blocks) a servo area 30. The servo area 30 has stored therein signals readable by the servo head 16B and usable for positioning the heads 16A, 16B, and 16C on the drum 14 relative to the tape 12. A particular servo scheme and format usable in conjunction with an embodiment of the present invention is shown in U.S. Pat. No. 4,843,495, previously incorporated by reference herein. In accordance with the illustrated servo scheme, the servo data in the servo area 30 is recorded only at the beginning of a track 18 and is sampled only once per revolution of the heads 16.

The helical-scan servo systems of the present invention advantageously read distorted tracks. A "distorted track" or "distorted stripe" as used herein means a track that deviates from any one or more of the following nominal, predetermined parameters: track pitch; track angle; track length; and track straightness.

As indicated above, various types of problems may cause track distortion. One type of example is a mechanical tape guiding problem which may cause the tape to establish an alignment which is different from the proper alignment of FIG. 3. This other or different alignment may achieve an equilibrium and persist until some change in the tape motion or external forces act on the tape to restore the tape to its desired alignment.

Figure 5:
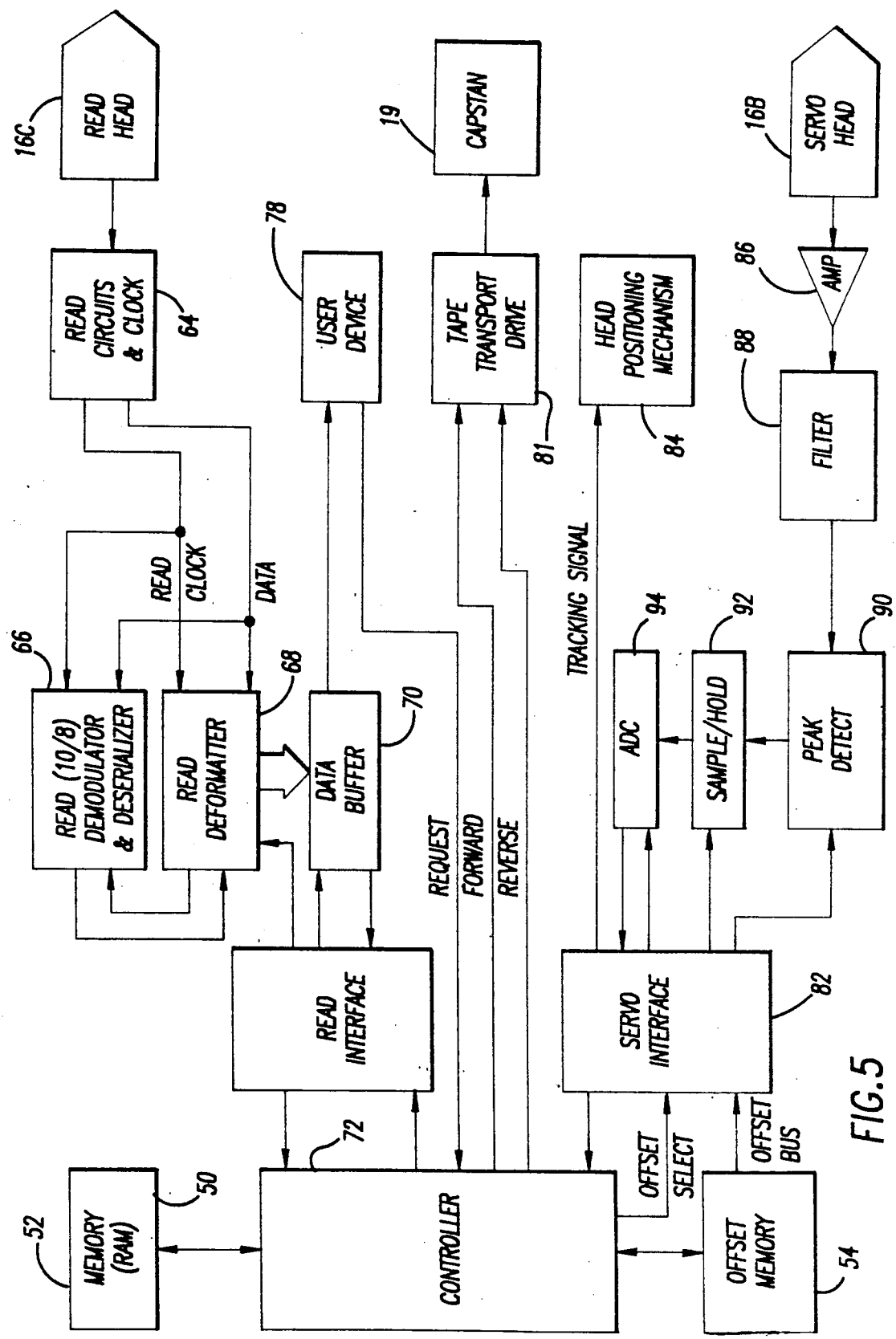
FIG. 5 is a schematic illustration of circuitry included in a helical scan drive system according to an embodiment of the invention.

In addition to the aforementioned elements, and as shown in FIG. 5, the helical drive system 10 of the invention further includes a controller 50, such as a micro-processor based micro-controller, for example. The controller 50 is connected to a bank of RAM memory 52 in conventional fashion. As will be seen hereinafter, an allocation table is stored in the RAM memory 52. The controller 50 is also connected to a memory chip 54, hereinafter also known as "OFFSET MEMORY". In one embodiment the memory chip 54 is a ROM chip, in another embodiment the memory chip 54 is a RAM chip. As will be explained hereinafter with reference to Table 1, the memory chip 54 is programmable with offset degree values.

The read head 16C is connected to apply signals read from the tape 12 to read circuits & clock 64 (See FIG. 5). Data to be read is received at the read circuits 64 and, together with a clock signal, is coupled to a read demodulator and deserializer 66 and to a read deformatter 68. In the read deformatter 66, certain header and referencing signals are removed from the data stream so that the recovered user data can be applied in block form to a data buffer 70. The operations of the data buffer 70 and the read deformatter 68 are managed by a read interface 72, which in turn is governed by the controller 50. Details of the structure and operation of the circuitry of FIG. 5 are understood from U.S. Pat. No. 4,835,628, already incorporated by reference.

FIG. 5 additionally shows a user device 78 such as a host computer and an associated interface. The user device 78 is connected to request user data from the controller 50 and to receive user blocks from the data buffer 70.

Figure 6:
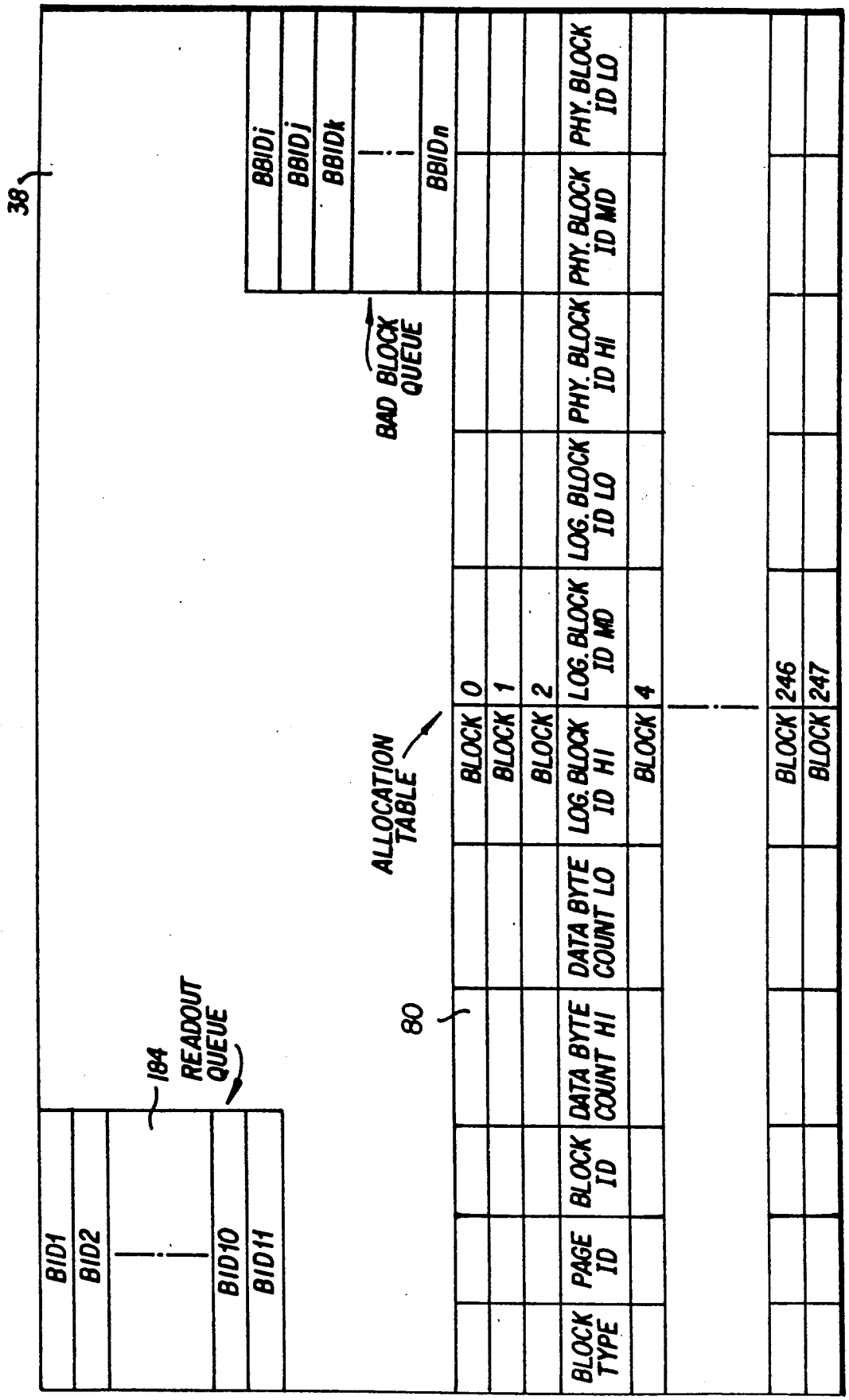
FIG. 6 is a schematic illustration depicting a portion of a controller memory including an allocation table according to an embodiment of the invention.

FIG. 6 schematically illustrates portions of the RAM memory 52 associated with the controller 50. The RAM memory 52 includes an allocation table 80. The allocation table 80 has stored therein certain parameters for as many as 248 blocks, shown as blocks 0–247 in FIG. 6. In FIG. 6, each block corresponds to a row of the allocation table 80. The parameters stored in the allocation table 80 for each block include block header information, including the BLOCK ID and PHYSICAL BLOCK ID parameters which are unique to each block.

Figure 7:
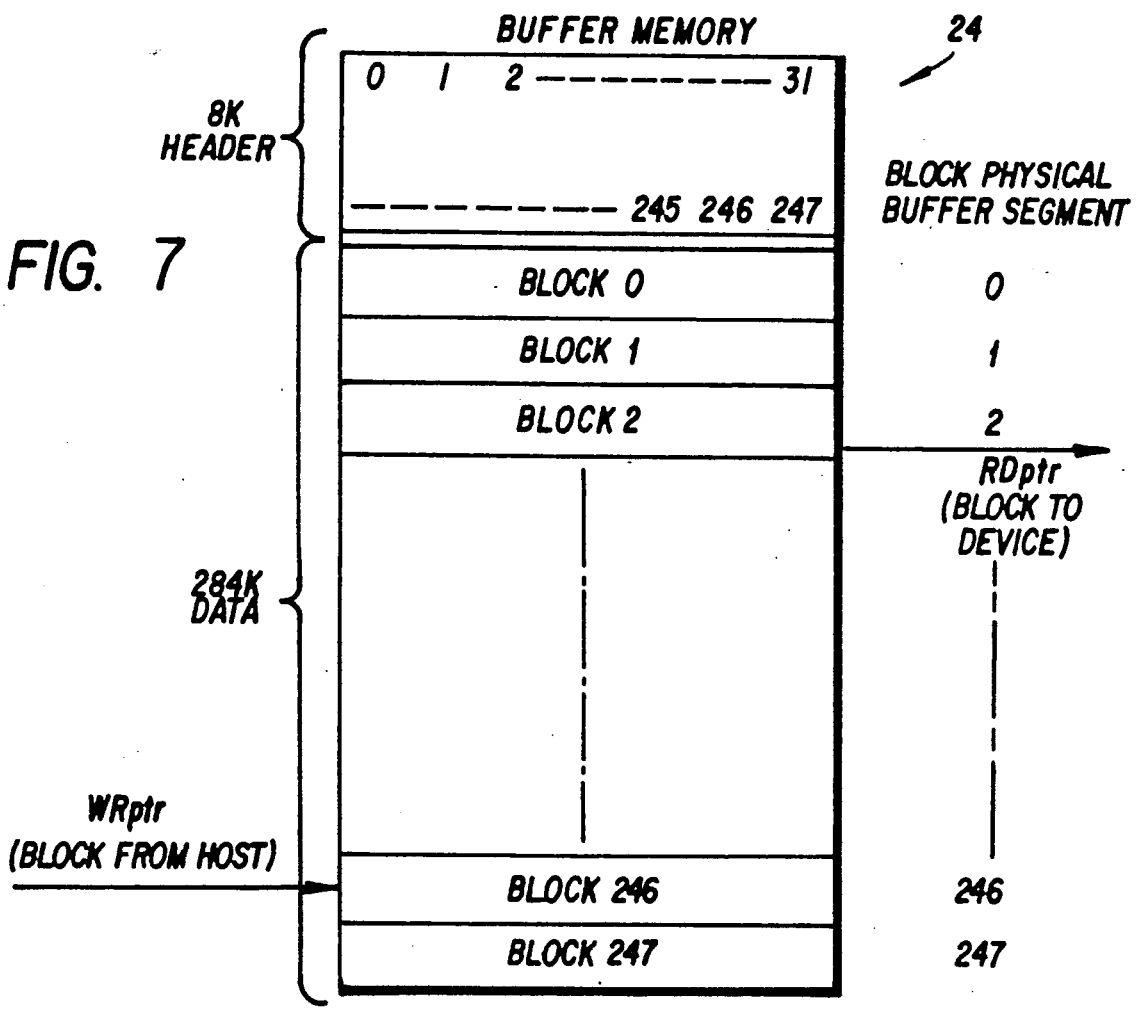
FIG. 7 is a schematic illustration depicting a memory organization scheme for a data buffer according to an embodiment of the invention.

FIG. 7 is a schematic view of the memory organization scheme of the data buffer 70. As shown in FIG. 7, the data buffer 70 includes 248K of memory for storing 248 blocks of user data, with each user block having a length of 1K. As will be seen hereinafter, when a user block of data is recognized by the read deformatter 68, the entire user block is transmitted to the data buffer 70 where the user block is stored at an appropriate address in the data buffer memory.

The controller 50 is connected to a tape transport drive 81 to direct the transport drive 81 to transport the tape in a forward direction (for tape reading) and in a reverse (e.g., rewind) direction. The transport drive actuates the capstan 19.

The controller 50 is also connected to a servo interface 82 (see FIG. 5). The servo interface 82 is connected to apply a tracking control signal to a servo head positioning mechanism 84. The head positioning mechanism 84 serves to adjust the position of the heads 16A, 16B, and 16C relative to the drum 14. The servo interface 82 has access to the offset values stored in the OFFSET MEMORY chip 54 via an OFFSET BUS. An OFFSET SELECT line from the controller 50 tells the servo interface 82 which of the offset values to use from the OFFSET MEMORY chip 54.

FIG. 5 also shows how servo signals detected by the servo head 16B are processed and applied for use by the servo interface 82. The servo head 16B has its output connected to amplifier circuitry 86. The amplified signal from circuitry 86 is then applied to filter circuitry 88, peak detector 90; sample and hold circuitry 92; and, analog-to-digital converter (ADC) 94. Details of the connections and operations of these servo signal-processing elements are understood by reference to U.S. Pat. No. 4,843,495, already incorporated by reference.

OPERATION

In operation, upon each rotation of the drum 14, when the read head 16C is in contact with the tape 12, the read head 16C traverses a predetermined azimuthal path across the magnetic tape 12 in the manner shown by FIG. 1. Assuming the read head 16C is correctly aligned with tracks that are properly readable as straight tracks, upon each rotation of the drum 14 the read head 16C acquires signals from eight blocks B0, B1, ... B7 as described hereinbefore.

The signals from the eight blocks acquired from the read head 16C are applied to the read circuits 64, and from thence to the read demodulator & deserializer 66 and to the read deformatter 68. The read deformatter 68 analyzes the signals obtained from the read head 16C and, by examining block header parameters exacted from the signals, determines the number of blocks that were in fact read from the track. The read deformatter 66 essentially strips the block header from each block, and for each block makes available to the read interface 72 certain block header parameters (including BLOCK ID and PHYSICAL BLOCK ID). Functioning in conjunction with the read interface 72, the controller 50 stores these block header parameters in the allocation table 80 of RAM 52 in the format shown in FIG. 6. Thus, at any given point in time, the allocation table 80 contains header data for every user block then stored in the data buffer 70.

Figure 8:
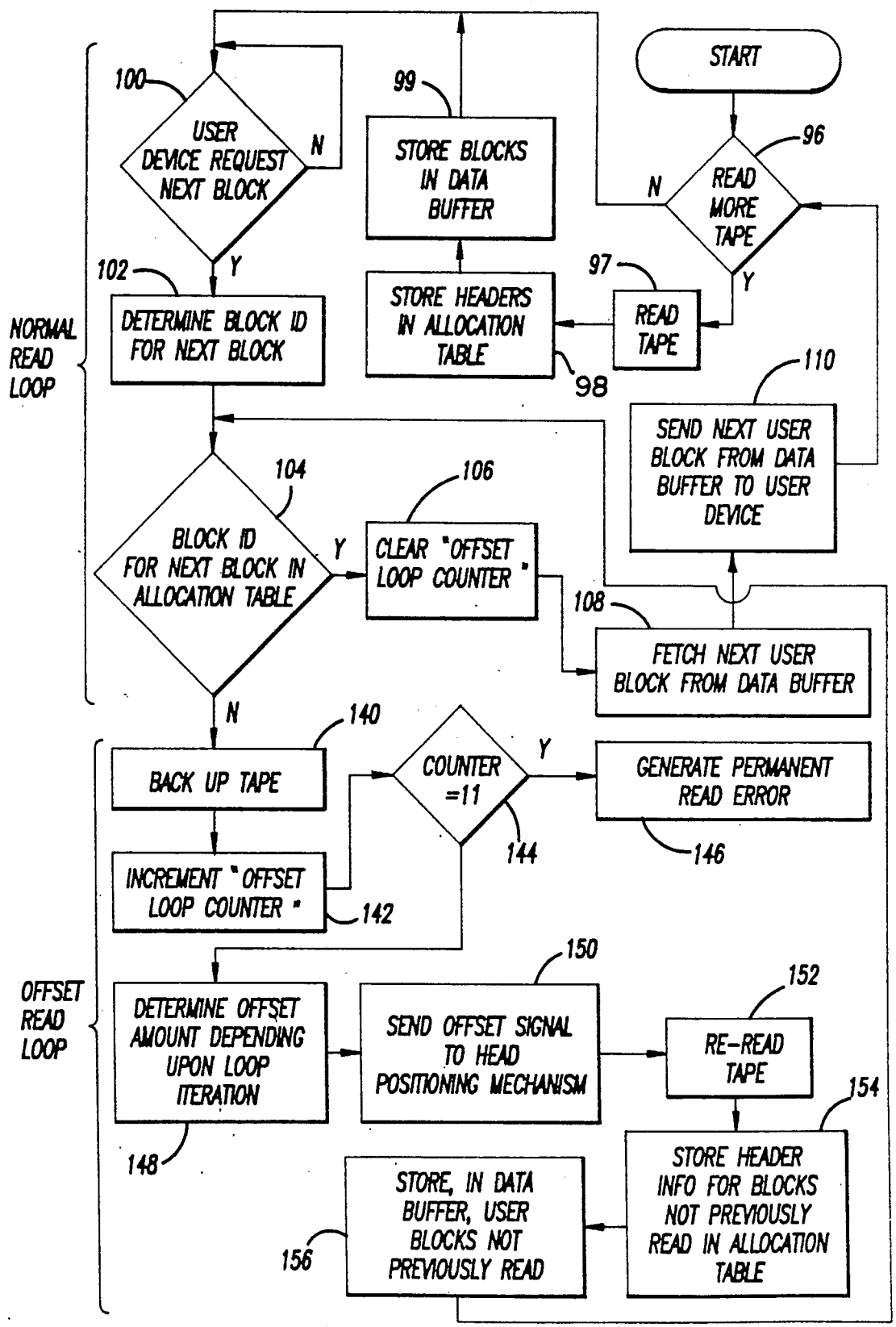
FIG. 8 is a schematic illustration of steps executed by a controller of the embodiment of FIG. 5 according to a mode of the invention.

FIG. 8 is a flowchart illustrating steps executed by the controller 50 in connection with the reading operation of the drive system 10 of FIG. 5. The steps of FIG. 8 are grouped into two execution loops. A first execution loop, labeled the NORMAL READ LOOP, is repetitively executed as long as all the blocks which are expected to be read from tape are, in fact, read. A second execution loop, labeled the OFFSET READ LOOP, is executed whenever it is determined that one or more blocks have not been found on the tape, as might occur when reading distorted tracks, for example.

At appropriate intervals the controller 50 determines that more tape should be read. This determination is represented by step 96. If additional tape is to be read, the tape is read as indicated by block 97. Upon reading of the tape, at step 98 header information from the blocks just read is stored into the next available locations in the allocation table 80 (see FIG. 6). At step 99, user data from the blocks just read is stored in the next available locations in the data buffer 70 (see FIG. 7).

As required, the user device 78 requests a next user block of information from the data buffer 70 by applying a request signal to the controller 50 (represented by step 100 of FIG. 8). Knowing the BLOCK ID for the block last sent to the user device 78, and knowing that the BLOCK IDs for successive blocks are in increasing monotonic sequence, at step 102 the controller 50 determines the value of BLOCK ID for the next requested block by incrementing the previous value of BLOCK ID.

Knowing now the value of BLOCK ID for the next requested user block, at step 104 the controller 50 checks the allocation table 82 to determine if the BLOCK ID for the next requested block is stored in the appropriate field in the allocation table 82. If the BLOCK ID for the next requested block is not stored in the allocation table 82, processing jumps to the OFFSET READ LOOP described below. Otherwise, the remainder of the NORMAL READ LOOP, comprising steps 106, 108, 110, and 96, and possibly steps 97, 98, and 99, is executed.

If the BLOCK ID for the next requested block is stored in the allocation table, at step 106 a counter denominated as LOOP OFFSET COUNTER is cleared (zeroed). Then, the user block having the next required BLOCK ID is obtained from the data buffer 70 (step 108) and sent to the user device 78 (step 110) in the manner specified in U.S. patent application Ser. No. 07/069,132 filed July 2, 1987, entitled METHOD AND APPARATUS FOR DATA BUFFER MANAGEMENT, commonly assigned herewith and incorporated herein by reference.

So long as the BLOCK IDs for requested blocks are stored in the allocation table 82, the loop entitled NORMAL READ LOOP is repetitively executed. That is, after the execution of step 110, processing ultimately loops back to step 100 so that the next BLOCK ID can be processed.

The loop NORMAL READ LOOP is executed by the controller 50 as long as the user device 78 is requesting blocks whose BLOCK IDs are stored in the allocation table. However, when the user device 78 requests a next block, and the BLOCK ID for that block is not stored in the allocation table 80 (i.e., a "hole" for that block exists in the allocation table), processing jumps to the OFFSET READ LOOP, and particularly to step 140.

As described below, the purpose of each execution of the OFFSET READ LOOP is to reposition the tape 12 and reposition the heads 16 so that the read head 16C will have another opportunity to read any blocks whose BLOCK ID values are missing from the allocation table 82. During each execution of the OFFSET READ LOOP, the heads 16 are repositioned or "offset" to a degree which differs from other executions of the OFFSET READ LOOP.

At step 140, the controller 50 applies a signal to the transport drive 81 so that the tape 12 is repositioned or rewound a fixed distance from the point at which the hole in the allocation table is discovered. The controller 50 is either programmed with a value indicative of this fixed rewind distance, or is programmed with data to calculate a value for this fixed rewind distance. In the illustrated embodiment, the fixed rewind distance is equal to the maximum distance that the missing block can be located from the present head position. This fixed rewind distance is calculated in dependence upon the particular block re-write criteria of the helical-scan system 10 (see, for example U.S. patent application Ser. No. 07/069,132); upon the format of the tape; and upon the format of the data buffer 70.

Since the OFFSET READ LOOP may ultimately be executed a plurality of times as hereinafter described, the counter OFFSET LOOP COUNTER is incremented at step 142 to keep track of the number of iterations of the OFFSET READ LOOP. For the first execution of the OFFSET READ LOOP, the value of the OFFSET LOOP COUNTER is "1".

At step 144 the value of the OFFSET LOOP COUNTER is evaluated to determine whether the OFFSET READ LOOP has been executed the maximum permitted number of times (e.g., "10" in the illustrated embodiment). If OFFSET LOOP COUNTER exceeds the maximum permitted number, processing is terminated and a permanent read error is generated at step 146. Otherwise, processing continues at step 148.

In the preferred embodiment of the invention, the number of consecutive executions of the OFFSET READ LOOP is limited to "10". The factors which influence this limit is the desire to avoid excessive wear to the media caused by repeated repositioning over a relatively short length of tape, and empirical reliability tests which indicate that a greater number of executions does not significantly increase the recovery of data blocks that are otherwise unreadable. At step 148, the controller 50 determines the degree of desired offset, which depends upon the number of the iteration of the OFFSET READ LOOP. In this respect, in the illustrated embodiment the controller 50 determines the degree of offset (relative to the initial path P0) by consulting the following look-up table of TABLE 1.

TABLE 1

| OFFSET LOOP COUNTER | OFFSET DEGREE (IN MICROMETERS) |
| --- | --- |
| 1 | 0 |
| 2 | −4.75 |
| 3 | +4.75 |
| 4 | +2.38 |
| 5 | −2.38 |
| 6 | −3.56 |
| 7 | +3.56 |
| 8 | +1.19 |
| 9 | −1.19 |
| 10 | 0 |

As employed in Table 1, a positive direction (+) is taken in the sense of the arrow 15 reflecting the forward direction of the tape, while the negative direction (−) is taken in the opposite sense.

The look-up table of Table 1 is stored in the OFFSET MEMORY chip 54. In one embodiment of the invention, the chip 54 is a read only memory (ROM). In another embodiment, the look-up table reflected by Table 1 is stored in random access memory (RAM), i.e., the chip is a RAM chip.

The offset degree values of Table 1 are available to the servo interface 82 via the OFFSET BUS. After making the determination at step 148 as to which offset degree value should be utilized by the servo interface 82, the controller 50 so informs the servo interface 82 by an OFFSET SELECT signal.

Using the selected offset degree value, at step 150 the servo interface 82 sends the head positioning mechanism 84 a tracking error signal. This tracking error signal is determined much in the manner of U.S. Pat. No. 4,843,495 but includes an offset component having a value indicative of the offset degree obtained from the look-up table for the particular iteration of the OFFSET READ LOOP. For example, for the first execution of the OFFSET READ LOOP, the degree of servo offset is zero. For the second execution of the OFFSET READ LOOP, the degree of servo offset is −4.75 micrometers.

With the degree of offset having been determined in the manner described above with reference to step 148, at step 152 the tape 15 is re-read with the heads 16 being offset in accordance with the selected offset degree value. As the tape 15 is being re-read, at step 154 header information is stored in the allocation table 82 for any blocks read during the re-read of step 152, provided those blocks were not previously read. Similarly, at step 156 the data buffer is loaded with the user data from blocks whose header information is stored in the allocation table 82 during the re-read operation of step 152.

After execution of step 156, processing jumps back to step 104. At step 104, it is determined whether a block requested by the user device 78, but previously missing from the allocation table 82 and data buffer 70, can now be located in the allocation table 82 and the data buffer 70. If the determination is negative (i.e., the requested block still cannot be located), the OFFSET READ LOOP is again executed, but with a different offset (as determined at step 148 depending on the value of the OFFSET LOOP COUNTER).

If the determination at step 104 is positive, the steps 106, 108 and 110 are again executed in the manner described above. Moreover, if it is determined at step 96 that more tape is to be read, the tape is read with the read head 16C positioned at the offset determined by the last execution of step 150. That is, the head 16C maintains the same offset for reading tape at step 97 as the head 16C had when last re-reading tape at step 152. This same offset value is maintained, perhaps for repeated executions of the NORMAL READ LOOP, until another negative determination is made at step 104 (i.e., until another "hole" is found in the allocation table 80).

Thus, a non-zero offset value obtained during the OFFSET READ LOOP is retained and repeatedly utilized in the NORMAL READ LOOP until that offset value no longer results in the effective reading of blocks (e.g., results in "holes" in the allocation table 80). When the offset value no longer results in the effective reading of blocks as indicated by a negative determination at step 104, the offset will be set to zero (since the OFFSET LOOP COUNTER was previously cleared at step 106, and will be incremented to "1" at the next execution of step 142).

As indicated above, for the first execution of the OFFSET READ LOOP, the degree of offset is "0". That is, the position of the heads 16 does not change relative to the paths P0. The value for the offset for this first "retry" of the OFFSET READ LOOP is chosen to be "0" for two reasons. First, it has been found that most data blocks can be recovered when re-read without any offset. This is due to the transient noise and transient head-to-tape interface phenomena which causes the data to be unreadable on the first attempt due to an insufficient signal-to-noise ratio.

The second reason for choosing the first "retry" of the OFFSET READ LOOP to be "0" pertains to the iterative nature of the offset tracking recovery method, and particularly to the retention of non-zero offset values during subsequent read operations. In this respect, it was mentioned previously that a non-zero offset degree value obtained at step 148 could be retained for the next reading of the tape at step 97. In some cases, such as that of Example 2 infra, a non-zero offset value will result in a successful read of many further data blocks without any problems. However, in other cases, the non-zero offset value will allow the system to subsequently read only a portion of the blocks on the distorted tracks, with the result that "holes" are created in the allocation table 80. For these latter cases, the first retry should be a zero offset, since the zero offset is the value that is most likely to work for blocks located near the beginning of a track. It is not unusual for a system according to the invention which is reading distorted tracks to alternate between two values of offset that allow the system to read all data blocks. Typically one of those offset values is zero and the other one of the offset values is one of the non-zero offset values from Table 1.

The last "retry" value is also zero in order to reset the offset value to zero when a permanent read error is generated at step 146. This ensures that subsequent operations are not accidentally performed with a non-zero offset. Although this resetting of the offset can be performed in other ways, embedding it into the look-up table ensures that the offset will be cleared.

The other values (i.e., degrees) of offset in Table 1 are determined by the characteristics of the tape format, the head arrangement on the rotating drum 14, and the nature of the mechanisms which cause the tracks to appear distorted when they are read. The values provided in Table 1 are for the illustrated embodiment of the EXB-8200. These offset degree values were empirically determined by testing the offset requirements for different tapes that exhibit the distortion characteristics such as curved track or abnormal track pitch. The likelihood of the phenomena were then ranked such that the offset degree values which work for the more likely forms of distortion are tried sooner than the least likely.

The largest degree values of offset in the case of the illustrated embodiment are limited by the track layout which as single azimuth tracks separated by a nominal 6 micrometer gap and a read head alignment tolerance of ±1 micrometer. This results in a maximum allowable offset degree of 5 micrometers before the head would begin to read data from two tracks simultaneously, thus rendering the offset ineffectual. Each type of system which employs the invention will have its own set of criteria upon which to base the magnitude of the offset degrees, and the sequence and number of offset degree values that are used in the data recovery procedure.

Figure 10:
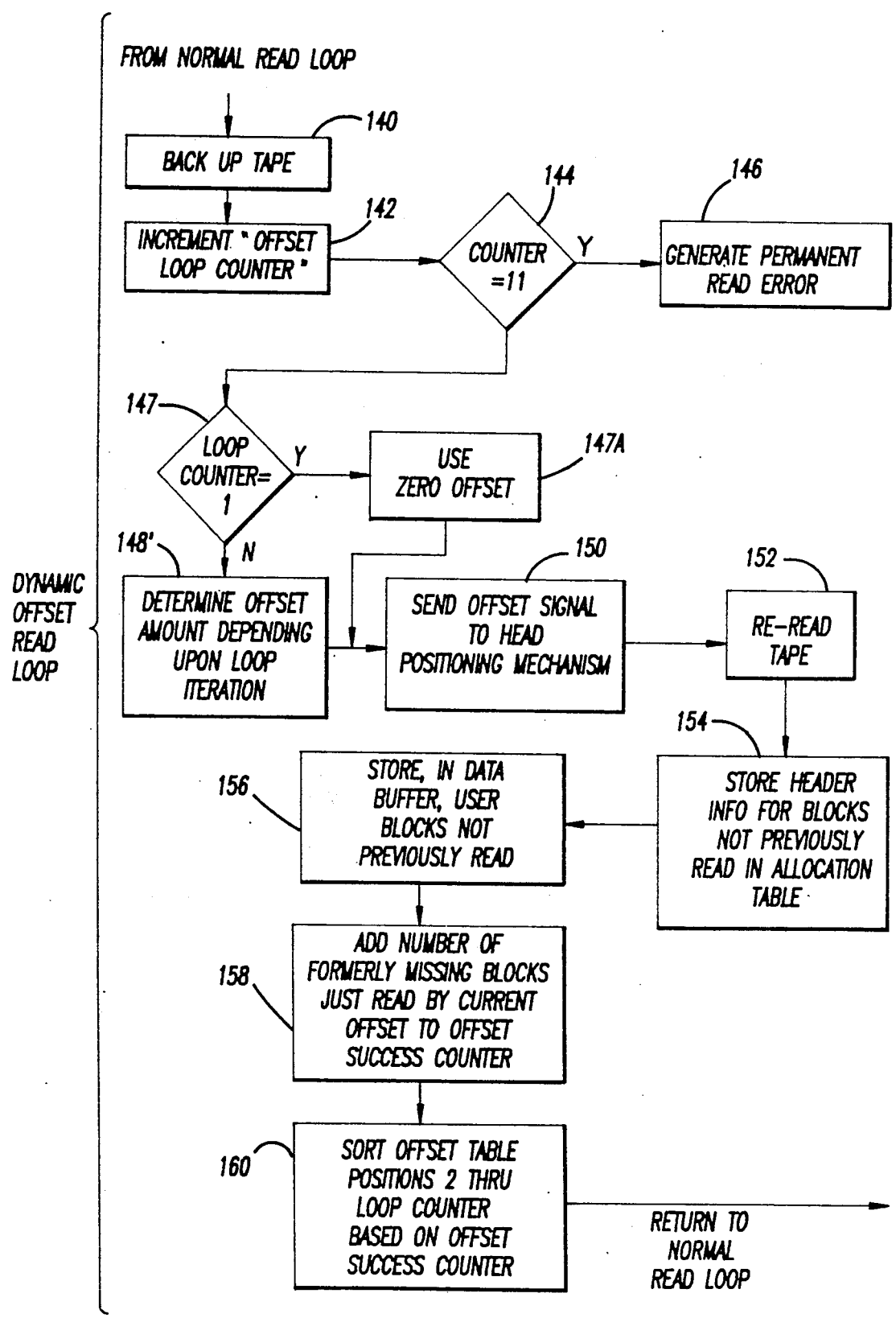
FIG. 10 is a schematic illustration of steps included in a DYNAMIC OFFSET READ LOOP executed by a controller of the embodiment of FIG. 5 according to a mode of the invention.

FIG. 10 is a schematic illustration of steps included in a DYNAMIC OFFSET READ LOOP that are executed by an embodiment of the invention wherein the OFFSET MEMORY 54 is a RAM chip rather than a ROM chip. As will be explained below and with reference to Example 2, execution of the DYNAMIC OFFSET READ LOOP enables the controller 50 to select between a plurality of offset degrees, with the selection being based upon the previous success rate of each offset in reading missing blocks from the tape. In this respect, the DYNAMIC OFFSET READ LOOP enables the controller 50 to develop a utilization sequence of the various offset degrees which can be utilized, and to dynamically re-order the utilization sequence based upon the success rate of each offset degree.

In this mode of the invention, the DYNAMIC OFFSET READ LOOP of FIG. 10 replaces the OFFSET READ LOOP of FIG. 8. Like the OFFSET READ LOOP of FIG. 8, however, the DYNAMIC OFFSET READ LOOP of FIG. 10 is entered after and exits before step 104 of FIG. 8.

The DYNAMIC OFFSET READ LOOP of FIG. 10 has several steps which are similar to those of FIG. 8, with the similar steps bearing the same reference numerals in FIG. 10. For example, the DYNAMIC OFFSET READ LOOP reverses the tape (step 140); increments the OFFSET LOOP COUNTER (step 142; and, checks the value of OFFSET LOOP COUNTER to determine whether the DYNAMIC OFFSET LOOP has already been executed a maximum permitted number of times (step 144).

At step 147 the controller 50 determines whether this is the first execution of the DYNAMIC OFFSET READ LOOP (i.e., whether the value of OFFSET LOOP COUNTER is "1". If the result is affirmative, the controller 50 insures that the original azimuthal paths are again followed by requiring a zero offset for the read head 16C (step 147A). Otherwise, at step 148' the controller 50 determines the amount or degree of offset by searching the OFFSET MEMORY chip 54 and obtaining the offset degree value that corresponds to the value of the OFFSET LOOP COUNTER. For example, during the second execution of the DYNAMIC OFFSET READ LOOP, the second offset degree value stored in the OFFSET MEMORY chip 54 is utilized. Assuming that the contents of the OFFSET MEMORY chip 54 is as shown in Table 1 supra, a value of −4.75 micrometers is obtained.

Steps 150, 152, 154, and 156 are the same as those executed for the OFFSET READ LOOP of FIG. 8. The re-wound tape is re-read (step 152), and for any previously missing blocks now successfully read the block header information is stored in the allocation table 80 (step 154) and the user data from the blocks is stored in the data buffer 70 (step 156).

Associated with each offset degree value there is a corresponding success counter stored in RAM memory. For example, there is a success counter for the "0" offset degree; for the "−4.74 micrometer" offset degree; for the "+4.75 micrometer" offset degree; for the "+2.38 micrometer" offset degree; and so forth. At step 158 of the DYNAMIC OFFSET READ LOOP of FIG. 10, the success counter for the particular head offset degree utilized for the most recent re-read of step 152 is increased by the number of formerly missing blocks that were successfully read for the first time at the current head offset degree. For example, if the head offset degree for the re-read of step 152 were +4.75 micrometers, and three missing blocks were successfully read for the first time at step 152, the success counter for the +4.75 micrometer" offset degree is incremented by "3".

At step 160 the controller 50 sorts or rearranges memory locations of the OFFSET MEMORY based on the contents of the offset success counters. The number of the memory locations rearranged depends on the value of the OFFSET LOOP COUNTER, so that only the memory locations two through and including the current value of OFFSET LOOP COUNTER are subject to being rearrangement. The criteria for rearrangement is that the non-zero offset degree values be arranged in accordance with the decreasing order of their corresponding offset success counters.

Accordingly, as a result of the rearrangement implemented by the DYNAMIC OFFSET READ LOOP of FIG. 10, after all currently missing blocks are located, and when the DYNAMIC OFFSET READ LOOP is next entered for subsequently discovered missing blocks, the contents of the OFFSET MEMORY chip 54 will be configured so that, based upon previous history with this tape, the most likely successful non-zero offset degree will utilized prior to other non-zero offsets, with the other non-zero offset degrees thereafter being utilized, if necessary, in the order of probability of success.

EXAMPLE 1

Figure 4:
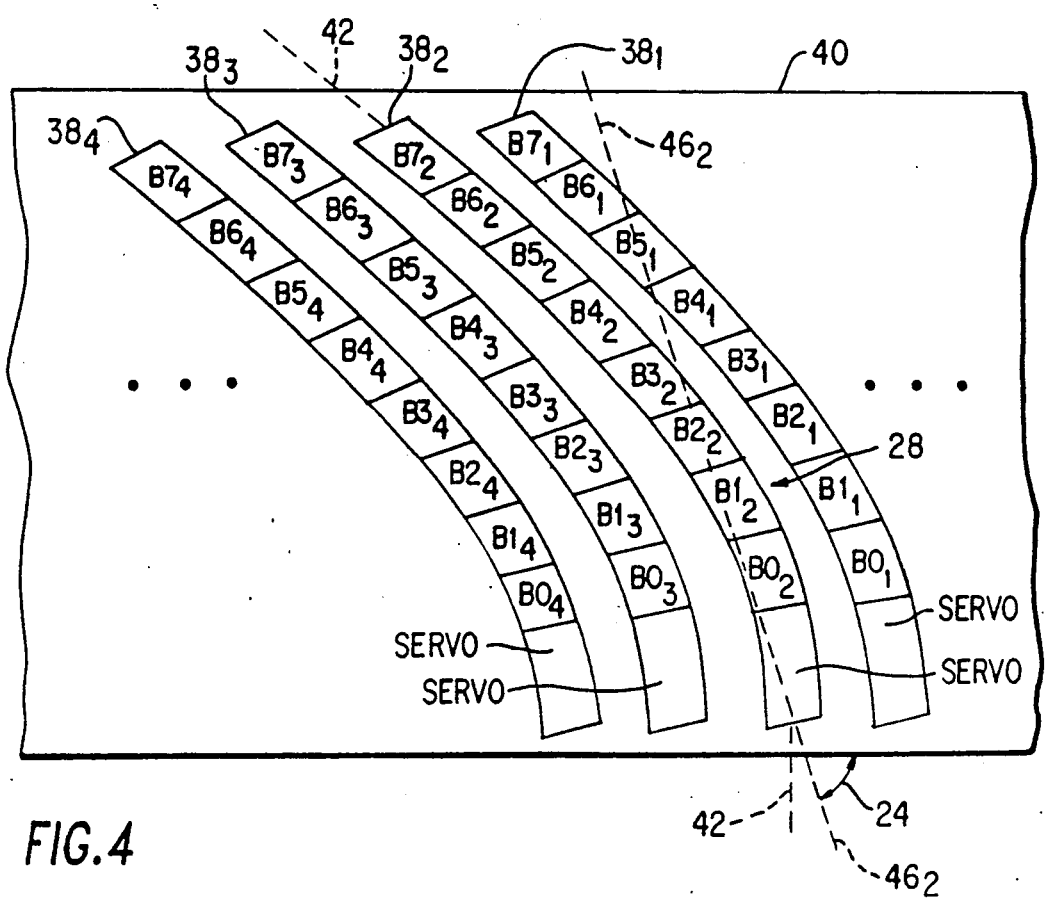
FIG. 4 is a schematic illustration of distorted tracks appearing on magnetic tape upon a tape read operation.

FIG. 4 illustrates a plurality of distorted tracks or stripes $38_1$, $38_2$, $38_3$, and $38_4$ on a tape 40. The distorted tracks 38 of FIG. 4 are distorted in the sense that the tracks 38 are each curved rather than being straight. When a distorted track such as track $38_2$ is read, generally at the beginning of the track the heads 16 follow a centerline $42_2$ of the track $38_2$. As long as the centerline $42_2$ of the track remains essentially straight and oriented at the a angle 24, the blocks stored on the track $38_2$ will be read and stored in a memory buffer 44. However, as the distorted track $38_2$ begins to curve or deviate from the a trajectory of the head (as shown by line $46_2$ in FIG. 4, for example), the quality of the read signal developed by read head 16C will decrease until the data blocks on the distorted track $38_2$ can no longer be read. If the curvature of the track $38_2$ is as great as is shown in FIG. 4, the read head 16C will only traverse a chord of the distorted track $38_2$, and will then actually cross over the inter-track guard band 28 and begin to read data blocks from an adjacent track, such as track $38_1$.

Figure 4A:
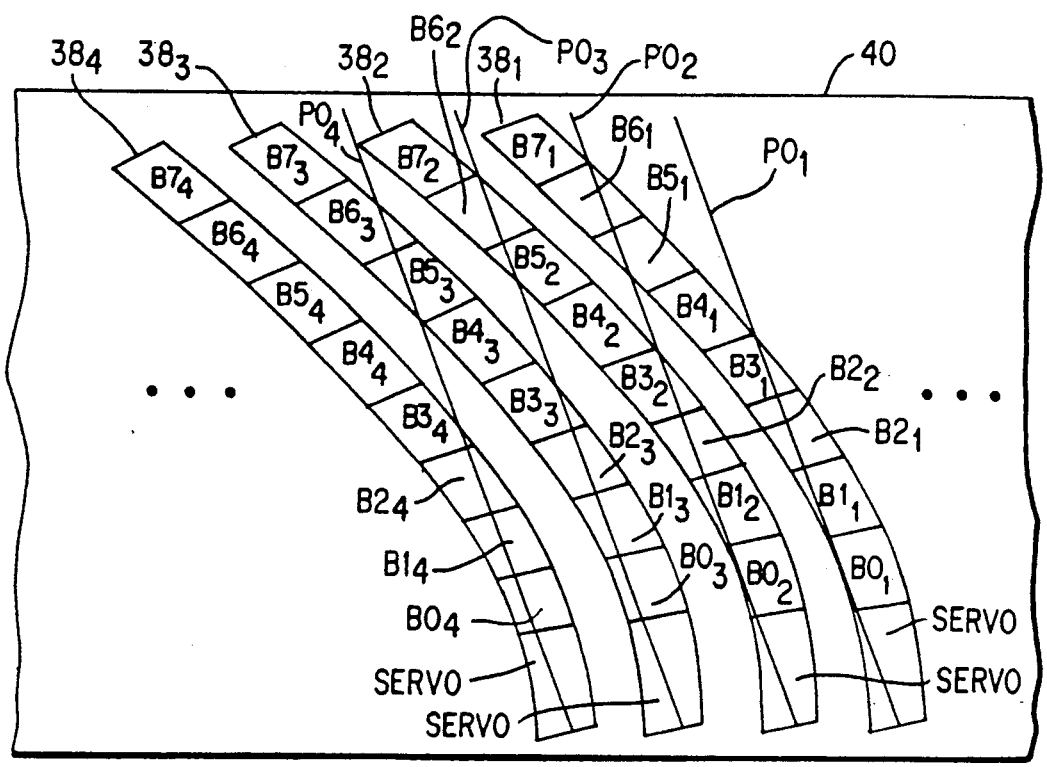
FIG. 4A is s a schematic illustration showing original azimuthal paths across distorted tracks appearing on magnetic tape during a tape read operation.

FIG. 4A shows a set of original azimuthal paths $P0_1$, $P0_2$, $P0_3$, and $P0_4$ traversed by read head 16C during four consecutive illustrative rotations of the magnetic drum 14. As used herein, the term "original azimuthal paths" refers to the paths on the tape that would ordinarily be traversed by the read head 16C in accordance with servo signal tracking techniques, i.e., without any head offset (or a zero offset) of the present invention occasioned by the detection of missing data blocks.

As shown in FIG. 4A, each of the original azimuthal paths P0 overlap the beginning of the respective tracks 38. However, before the head 16C travels half the distance of each track 38, the curved nature of the tracks 38 causes the tracks 38 to diverge from the straight paths P0.

After the read head 16C travels the original azimuthal paths $P0_1$, $P0_2$, $P0_3$, and $P0_4$ of FIG. 4A, at step 104 of FIG. 8 the allocation table 80 will contain BLOCK ID values for blocks $B0_1$–$B3_1$ from track $38_1$; followed by BLOCK ID values for blocks $B0_2$–$B3_2$ from track $38_2$; followed by BLOCK ID values for blocks $B5_1$ and $B6_1$ from track $38_1$; followed by BLOCK ID values for blocks $B0_3$–$B2_3$ from track $38_3$; followed by BLOCK ID values for blocks $B5_2$ and $B6_2$ from track $38_2$; followed by BLOCK ID values for blocks $B0_4$–$B2_4$ from track $38_4$; followed by BLOCK ID values for blocks $B4_3$ and $B5_3$ from track $38_3$.

Thus, with reference to FIG. 4A, it is seen that read head 16C traverses only the first four blocks of track $38_1$ travelling path $P0_1$. When travelling path $P0_2$, head 16C first travels over the first four blocks of track $38_2$; crosses over the inter-track guard band 28; and then travels over two of the blocks ($B5_1$ and $B6_1$) of the track $38_1$. The paths $P0_3$ and $P0_4$ are discernable from the foregoing description and FIG. 4A.

After the read head 16C traverses the paths $P0_1$, $P0_2$, $P0_3$, and $P0_4$ as shown in FIG. 4A, the allocation table 82 fails to contain BLOCK ID values for several blocks located in tracks $38_1$, $38_2$, and $38_3$. BLOCK ID values are not stored in the allocation table 82 for the blocks which were not read by the read head 16C due to the distorted nature of the tracks $38_1$, $38_2$, and $38_3$, in particular blocks $B4_1$, $B7_1$, $B4_2$, $B7_2$, $B3_3$, $B6_3$, and $B7_3$. Accordingly, the allocation table 82 contains "holes" for these missing blocks.

Since "holes" were found in the allocation table 80 at step 104 of FIG. 5 when reading the tracks 38 of FIG. 4A, processing jumps to the OFFSET READ LOOP of FIG. 5. The tape is repositioned (step 140) and re-read with a zero offset (since an OFFSET LOOP COUNTER value of "1" computed at step 142 corresponds to a zero magnitude offset per Table 1).

For the particular example of FIG. 4A, re-reading of the tape at step 152 with zero offset fails to recover any of the previously missing blocks (i.e., blocks $B4_1$, $B7_1$, $B4_2$, $B7_2$, $B3_3$, $B6_3$, and $B7_3$). Accordingly, the OFFSET READ LOOP is executed a second time. During the second execution of the OFFSET READ LOOP, at step 148 the controller 50 determines, in accordance with Table 1 based upon an OFFSET LOOP COUNTER value of "2", that an offset of $-4.75$ micrometers should be implemented.

Figure 4B:
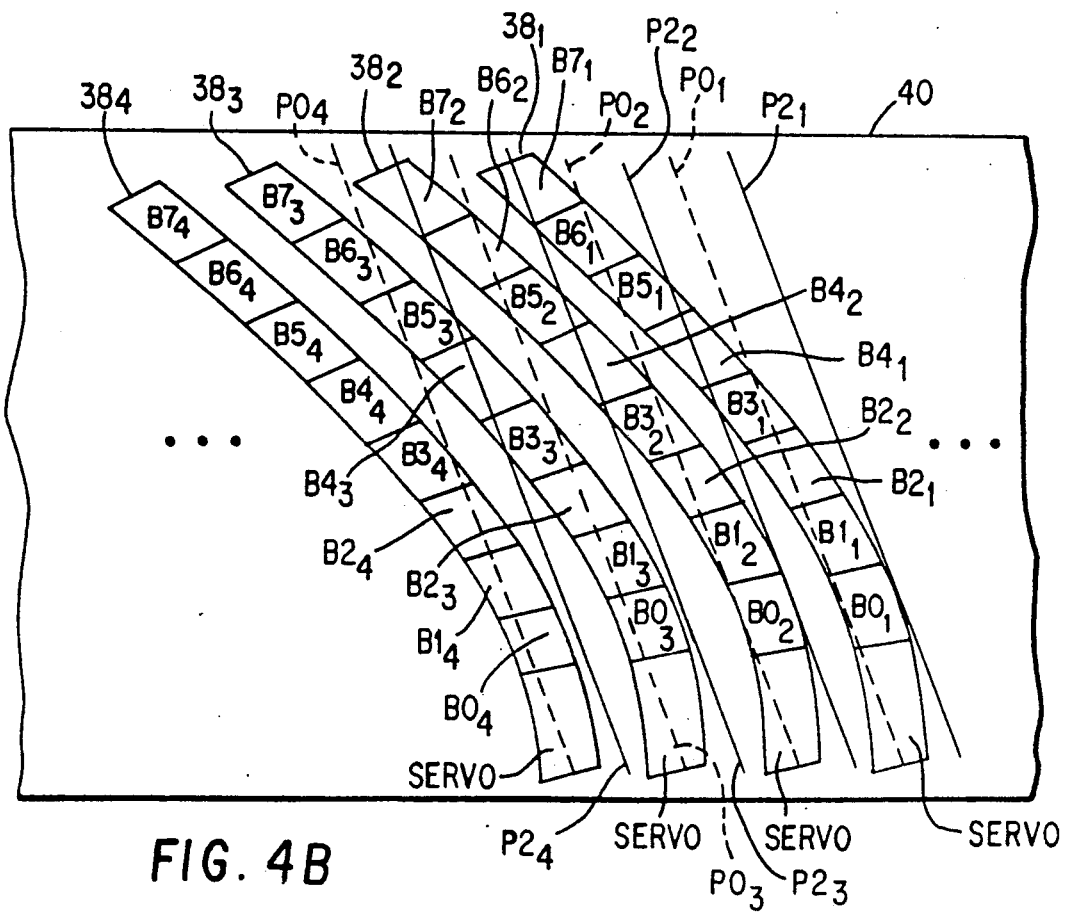
FIG. 4B is a schematic illustration showing first modified paths across distorted tracks appearing on magnetic tape during a tape read operation.

FIG. 4B shows a set of modified azimuthal paths $P2_1$, $P2_2$, $P2_3$, and $P2_4$ travelled by the read head 16C at step 152 of the second execution of the OFFSET READ LOOP (i.e., OFFSET LOOP COUNTER=2). As shown in FIG. 4B, each modified azimuthal path P2 is 4.75 micrometers to the left (i.e., upstream) of its respective original azimuthal path P0 (the original azimuthal paths P0 being shown in broken lines in FIG. 4B), and is parallel to its respective original azimuthal path P0.

In travelling the modified azimuthal paths $P2_1$, $P2_2$, $P2_3$, and $P2_4$ during step 152 of the second execution of the OFFSET READ LOOP, the read head 16C reads block $B4_1$ and $B5_1$ of track $38_1$; followed by block $B4_2$ of track $38_2$; followed by blocks $B6_1$ and $B7_1$ of track $38_1$; followed by blocks $B3_3$ and $B4_3$ of track $38_3$; followed by blocks $B6_2$ and $B7_2$ of track $38_2$.

Of the blocks previously missing from the data buffer 70 (i.e., blocks $B4_1$, $B7_1$, $B7_2$, $B3_3$, $B6_3$, and $B7_3$), blocks $B4_1$, $B7_1$, $B4_2$, $B7_2$, and $B3_3$ are read during the step 152 of the second execution of the OFFSET READ LOOP of FIG. 8. Accordingly, at step 154 header information for the newly acquired blocks are stored in the allocation table 82 and at step 156 the user data for those newly acquired blocks are stored in the data buffer 70. Execution then jumps back to step 104.

After the second execution of the OFFSET READ LOOP of the present example, blocks $B6_3$ and $B7_3$ are still missing from the data buffer 70 (as evidenced by the fact that their BLOCK IDs are not in the allocation table 82). Accordingly, if either block B6₃ or B7₃ is the block next requested by the utilization device 78, execution jumps to the OFFSET READ LOOP for yet a third offset retry.

Figure 4C:
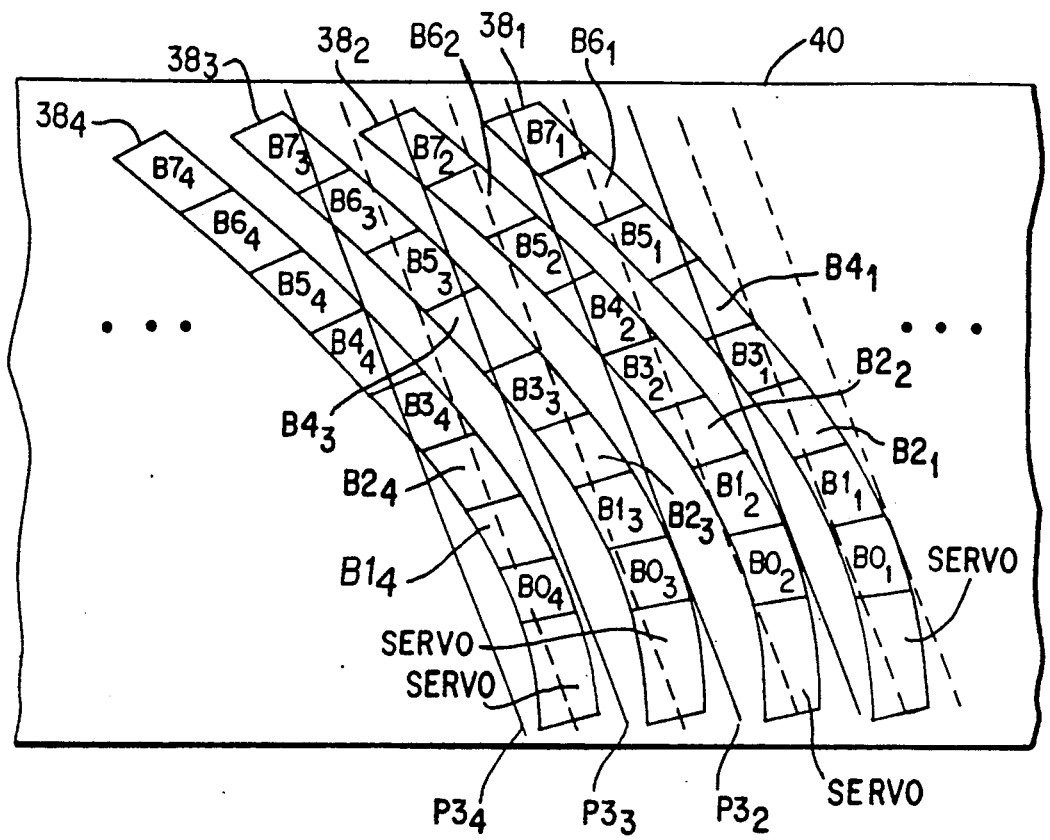
FIG. 4C is a schematic illustration showing second modified azimuthal paths across distorted tracks appearing on magnetic tape during a tape read operation.

During the third execution of the OFFSET READ LOOP (e.g., OFFSET LOOP COUNT=3), at step 148 the controller 50 determines that an offset of +4.75 micrometers should be utilized. In this regard, FIG. 4C shows a set of modified azimuthal paths $P3_1$, $P3_2$, $P3_3$, and $P3_4$ travelled by the read head 16C at step 152 of the third execution of the OFFSET READ LOOP. As shown in FIG. 4C, each modified azimuthal path P3 is 4.75 micrometers to the right (i.e., downstream) of its respective original azimuthal path P0.

As shown in FIG. 4C, during the third execution of the OFFSET READ LOOP of FIG. 8, the read head 16C travels over the previously un-read blocks B6₃ or B7₃ so that those blocks can now be read. Accordingly, at steps 154 and 156, the header and user data from these blocks are stored in the allocation table 82 and data buffer 70, respectively.

For the next reading of the tape at step 97, the +4.75 micrometer offset, obtained during the third execution of the OFFSET READ LOOP, will be utilized. Subsequent reading of the tape will likewise be at the +4.75 micrometer offset unless and/or until in any "holes" occur in the allocation table 80.

Figure 4D:
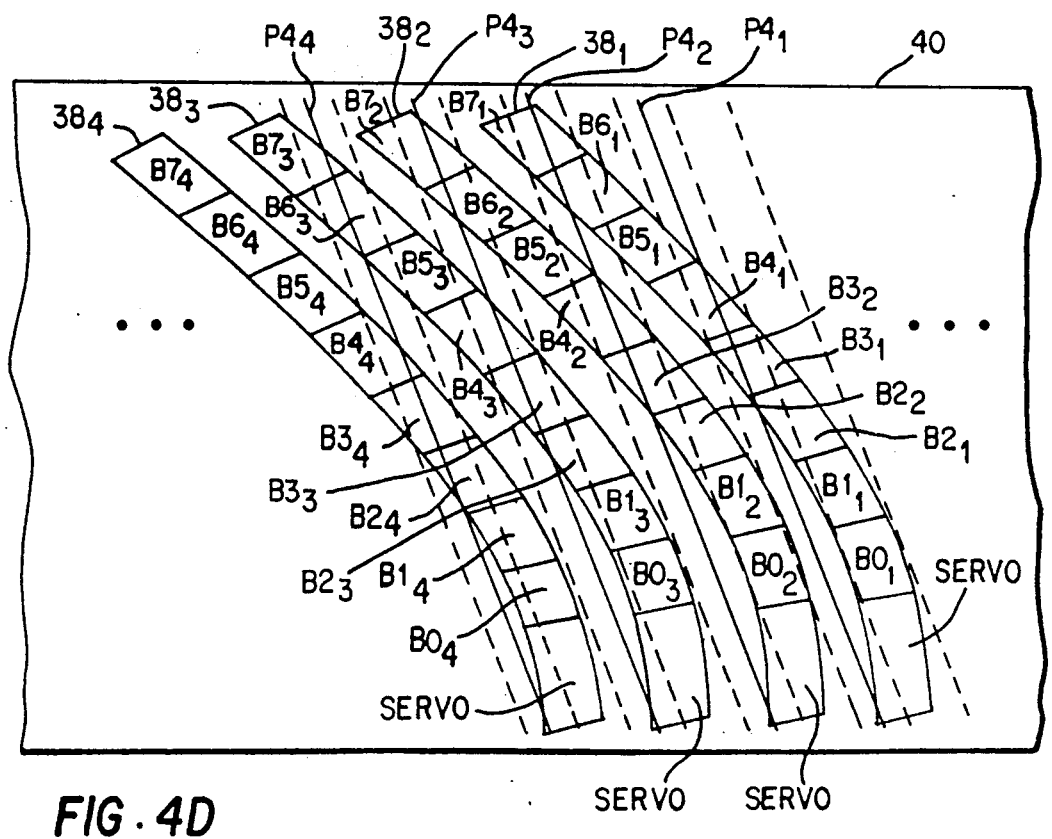
FIG. 4D is a schematic illustration showing third modified azimuthal paths across distorted tracks appearing on magnetic, tape during a tape read operation.

Although all blocks in distorted tracks $38_1$, $38_2$, and $38_3$ of the present example have been read by the completion of the third execution of the OFFSET READ LOOP, for the sake of illustration FIG. 4D shows the modified azimuthal paths $P4_1$, $P4_2$, $P4_3$, and $P4$ that the read head 16C would travel should a fourth execution of the OFFSET READ LOOP be required. As ascertained from Table 1, the offset amount for a fourth execution of the OFFSET READ LOOP of FIG. 8 would be +2.38 micrometers.

EXAMPLE 2

Figure 9:
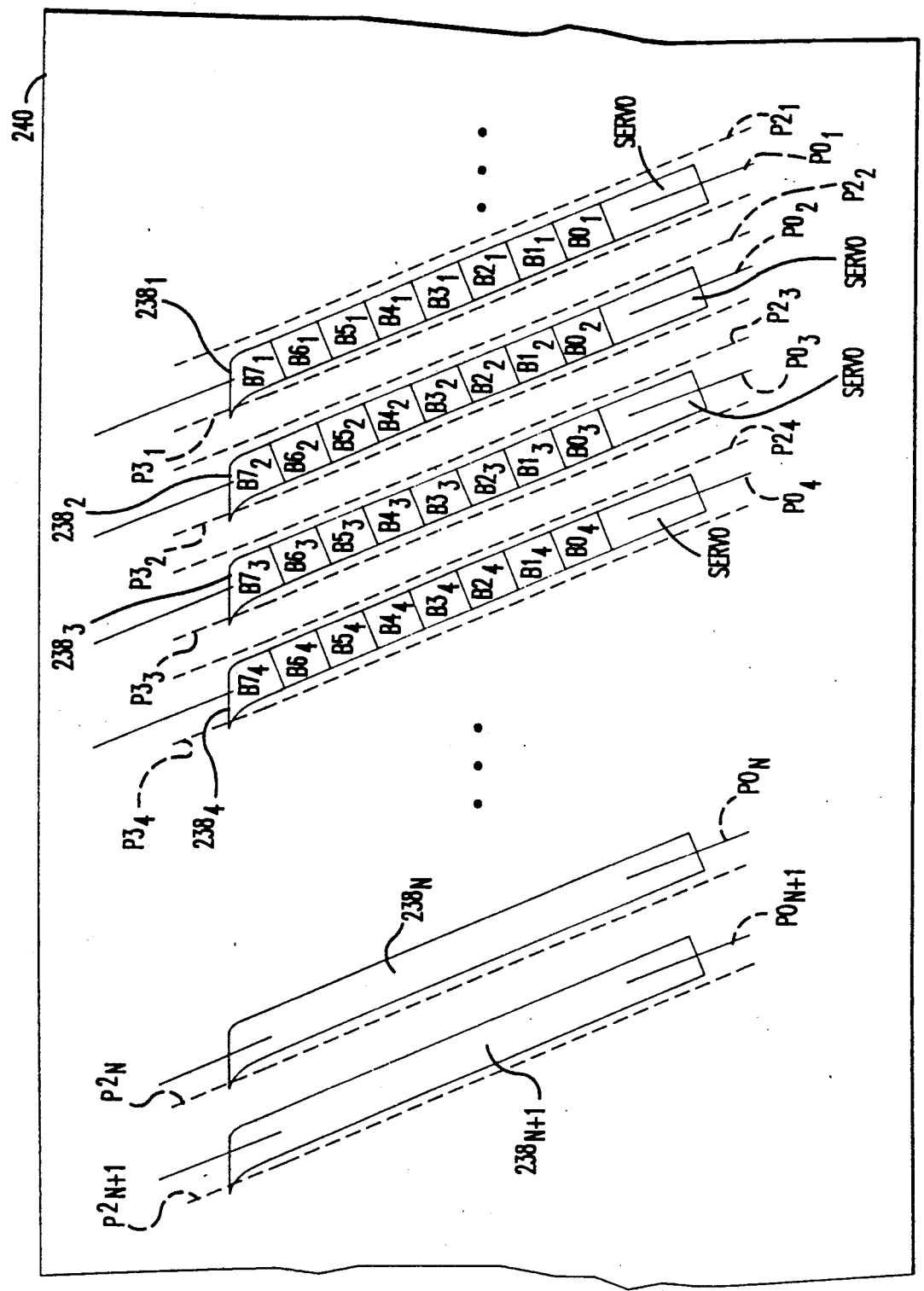
FIG. 9 is a schematic illustration showing original azimuthal paths and modified paths across distorted tracks appearing on magnetic tape during a tape read operation.

FIG. 9 shows distorted tracks $238_1$, $238_2$, $238_3$, $238_4$, . . . $238_N$, $238_{N+1}$ recorded on tape 240. When tracks $238_1$ through $238_3$ are first read, the read head 16C traverses original azimuthal paths $p0_1$, $p0_2$, $p0_3$, respectively. For the sake of the present example, when the read head 16C traverses the original azimuthal paths p0 for all tracks 238, the read head 16C is able to read all blocks on the track except the last block. That is, the read head 16C is able to read blocks B0 through B6 for each track 238, but is unable to read block B7 for each stripe 238.

After the read head 16C traverses each of the original azimuthal paths $p0_1$ through $p0_3$ of FIG. 9, the allocation table 70 has "holes" for missing blocks $B7_1$, $B7_2$, and $B7_3$. When the helical drive system 10 of the invention is operating in a mode wherein the offset degree values are stored in an OFFSET MEMORY chip 54 which is a RAM device, the discovery of holes in the allocation table causes the controller 50 to execute the DYNAMIC OFFSET READ LOOP of FIG. 10.

The first execution of the DYNAMIC OFFSET READ LOOP of FIG. 10 will, for reasons described above, result in a zero offset of the read head 16C so that the read head 16C will again traverse the original azimuthal paths p0. For the sake of this example, it is assumed that the missing blocks $B7_1$, $B7_2$, and $B7_3$ are not readable by the repeated traversal of the original azimuthal paths p0, with the result that the DYNAMIC OFFSET READ LOOP of FIG. 10 must again be entered.

At step 140 of the DYNAMIC OFFSET READ LOOP, the tape 240 is repositioned in the reverse direction so that the tracks $238_1$ through $238_3$ can again be read. At step 142 the value of the OFFSET LOOP COUNTER is incremented, with the value now reaching "2". Since the value of the OFFSET LOOP COUNTER does not equal "11" (as determined at step 144) or "1" (as determined at step 147), the controller 50 executes step 148' to determine the appropriate offset degree for this execution of the DYNAMIC OFFSET READ LOOP.

At step 148' the controller 50 obtains the second offset degree value stored in the OFFSET MEMORY 54, since this execution of the DYNAMIC OFFSET READ LOOP is the second execution (as reflected by the value of the OFFSET LOOP COUNTER). In this respect, at step 148' the controller 50 applies a signal on the OFFSET SELECT line to tell the servo interface 82 to use the second offset degree value stored in the OFFSET MEMORY chip 54. Assuming the contents of the OFFSET MEMORY chip 54 at this point in the execution to be reflected by Table 1 supra, an offset degree of −4.75 micrometers is obtained at step 148' and applied to the servo interface 82.

At step 150 a tracking signal including the value indicative of the offset degree value −4.75 is applied from the servo interface 82 to the head positioning mechanism 84. With the read head 16C now positioned 4.75 micrometers further upstream than formerly, at step 152 the controller 50 sends a signal to the tape transport drive 81 so that the tape can be re-read by the read head 16C. During the re-reading of the tape 240 that occurs during this second execution of the DYNAMIC OFFSET READ LOOP, the read head 16C traverses the modified azimuthal paths $p2_1$, $p2_2$, and $p2_3$ illustrated in FIG. 9.

As shown in FIG. 9, the traversal of the modified azimuthal paths $p2_1$, $p2_2$, and $p2_3$ by the read head 16C during the second execution of the DYNAMIC OFFSET READ LOOP fails to detect any of the missing blocks $B7_1$, $B7_2$, and $B7_3$. Accordingly, the offset success counter for the −4.75 micrometer degree offset remains zero at step 158, and there is no need to rearrange the contents of the OFFSET MEMORY at step 160.

Since the second execution of the DYNAMIC OFFSET READ LOOP failed to locate any missing blocks, the DYNAMIC OFFSET READ LOOP is entered for a third time. During the third execution of the DYNAMIC OFFSET READ LOOP, the offset degree value +4.75 is selected from the OFFSET MEMORY 54 (assuming that the contents of the OFFSET MEMORY at this point is still reflected by Table 1). As is understood with reference to FIG. 9, the modified azimuthal paths $p3_1$, $p3_2$, and $p3_3$ traversed with the read head 16C positioned at the +4.75 offset for the third execution of the DYNAMIC OFFSET READ LOOP enables the read head 16C to read the formerly missing blocks $B7_1$, $B7_2$, and $B7_3$. Accordingly, at step 158, the offset success counter for the "+4.75 offset degree" is incremented by a count of three ("3"). Then, at step 160, the contents of the OFFSET MEMORY of chip 54 is rearranged so that the contents thereof essentially resemble Table 2 rather than Table 1.

TABLE 2

| OFFSET LOOP COUNTER | OFFSET DEGREE (IN MICROMETERS) |
| --- | --- |
| 1 | 0 |
| 2 | +4.75 |
| 3 | −4.75 |
| 4 | +2.38 |
| 5 | −2.38 |
| 6 | −3.56 |
| 7 | +3.56 |
| 8 | +1.19 |
| 9 | −1.19 |
| 10 | 0 |

After the third execution of the DYNAMIC OFFSET READ LOOP of FIG. 10, all missing blocks from tracks $238_1$ through $238_3$ have been read, so processing continues with the NORMAL READ LOOP of FIG. 8.

When the read head 16C reaches the track $238_4$ and subsequent unillustrated tracks, the read head 16C continues to read with the offset +4.75 micrometers as determined during the third and previous execution of the DYNAMIC OFFSET READ LOOP. That is, the read head 16C traverses the path $p0_4$ and comparable subsequent paths when initially attempting to read track $238_4$ and subsequent tracks. However, as seen before, in traversing path $p0_4$, the read head 16C is able to read only the last block in each stripe, with the result that holes for the missing first six blocks of each track exist in the allocation table 70.

Upon the discovery of holes in the allocation table 70 with respect to track $238_4$ and subsequent tracks, the DYNAMIC OFFSET READ LOOP is entered. Since this execution of the DYNAMIC OFFSET READ LOOP will be the first execution for the newly discovered missing blocks, the value of the OFFSET LOOP COUNTER is set to "1" at step 142. In view of this value for the OFFSET LOOP COUNTER, steps 147 and 147A serve to automatically select a zero offset degree value for the read head 16C. Thus, when the tape is re-read at step 152, the read head 16C will traverse the azimuthal path $p0_4$ for track $238_4$ and comparable azimuthal paths for the subsequent tracks. Upon exiting the first execution of the DYNAMIC OFFSET READ LOOP, all formerly missing blocks (i.e., the first six blocks of each track) will have been located, so that processing then continues with the NORMAL READ LOOP of FIG. 8.

Assuming that the read head 16C is at zero offset when the head 16C reaches the tracks $238_N$ and $238_{N+1}$ illustrated in FIG. 9, it is apparent that traversal of the original azimuthal paths $p0_N$ and $p0_{N+1}$ for tracks $238_N$ and $238_{N+1}$ and subsequent tracks will facilitate only the reading of the first six blocks on each track. Accordingly, when holes corresponding to the last blocks of the tracks are noted in the allocation table, the DYNAMIC OFFSET READ LOOP is entered.

The first execution of the DYNAMIC OFFSET READ LOOP for tracks $238_N$ et seq. results in a zero and the re-traversal of the original azimuthal paths $p0_N$ et seq. as understood from previous descriptions of the execution of the DYNAMIC OFFSET READ LOOP. During the second execution of the DYNAMIC OFFSET READ LOOP for tracks $238_N$ et seq., i.e., when the value of the OFFSET LOOP COUNTER is "2", the controller 50 selects the second entry in the OFFSET MEMORY chip 54, which is now configured to resemble Table 2. Thus, the controller 50 ultimately causes the head 16C to be offset at +4.75 micrometers, rather than −4.75 micrometers. Accordingly, FIG. 9 shows a traversal of modified azimuthal paths $p2_N$ et seq. which are offset at +4.75 micrometers.

Thus, Example 2 shows how the contents of the OFFSET MEMORY chip 54 can be dynamically rearranged by the controller 50 so that the most likely non-zero head offset degree value is first utilized during the execution of the DYNAMIC OFFSET READ LOOP. The drive system illustrated by Example 2 will oscillate between a zero head offset and the +4.75 micrometer head offset in the manner just described.

Although only two offset degree values have been illustrated by Example 2, it should be understood that as many as ten different offset degree values can be stored in the OFFSET MEMORY chip 54, and that all ten values can be rearranged on the basis of the corresponding success counts of the values. In this manner the controller 50 is able to select the most promising order or utilization sequence of the head offset degree values, thereby expediting the reading and recovery of the tape.

It should also be understood that the DYNAMIC OFFSET READ LOOP of FIG. 10 can be modified so that even the zero offset value is re-arrangeable on the basis of the success counters.

Thus the invention provides apparatus and method for repositioning a read head based not only upon servo information, but also upon the detection of missed blocks of user data. The controller 50 of the invention selects between a plurality of possible head offsets degrees, based upon the historical success rate of those head offset degrees in reading blocks which formerly were missing blocks.

While the invention has been particularly shown and described with reference to the preferred embodiments thereof, it will be understood by those skilled in the art that various alterations in form and detail may be made therein without departing from the spirit and scope of the invention. For example, the entries in the look-up table stored in the OFFSET MEMORY chip 54 should be chosen in accordance with physical parameters of the particular helical scan system.

The embodiments of the invention in which an exclusive property or privilege is claimed are defined as follows:

1. Apparatus for reading information recorded on a storage medium in helical tracks, with each track comprising a plurality of blocks of data with each block having unique block-identifying information, said apparatus comprising:

means for transporting said storage medium in a direction of medium travel;

a rotatable drum having a portion of a peripheral surface thereof contiguous with said storage medium as said storage medium is transported therepast by said transporting means;

reading means mounted on said drum for traversing original azimuthal paths across said storage medium and for reading blocks including said block-identifying information recorded along at least a portion of each of said original azimuthal paths;

control means for using said block-identifying information to determine whether any blocks expected to be read during the traversal of said original azimuthal paths were not read and for generating a signal in accordance with said determination; and, repositioning means mounted on said drum and responsive to said signal generated by said control means for repositioning said reading means whereby said reading means traverses modified azimuthal paths in an attempt to read a block which should have been previously read but was not previously read, said modified azimuthal paths being offset with respect to said original azimuthal paths relative to said direction of medium travel.

2. The apparatus of claim 1, wherein said original azimuthal paths and said modified azimuthal paths are essentially linear, with said modified azimuthal paths being essentially parallel to said original azimuthal paths.

3. The apparatus of claim 1, wherein said modified azimuthal paths are each offset with respect to said original azimuthal paths by a first predetermined distance.

4. The apparatus of claim 1, wherein said control means further determines whether any blocks not read during the traversal of said original azimuthal paths are read during the traversal of said modified azimuthal paths.

5. The apparatus of claim 4, wherein in response to said determination said repositioning means repositions said reading means whereby said reading means traverses second modified azimuthal paths in an attempt to read a block which should have been previously read but was not previously read, said second modified azimuthal paths also being offset with respect to said original azimuthal paths, wherein said modified azimuthal paths are offset with respect to said original azimuthal paths by a first predetermined distance and wherein said second modified azimuthal paths are offset with respect to said original azimuthal paths by a second predetermined distance.

6. The apparatus of claim 1, further comprising memory means wherein said block-identifying information is stored, and wherein said control means examines said memory means to determine whether any blocks expected to be read during the traversal of said original azimuthal paths were not read.

7. A method for reading information recorded on a storage medium in helical tracks, with each track comprising a plurality of blocks of data with each block having unique block-identifying information, said method comprising:
transporting said storage medium in a direction of medium travel past a rotatable drum, said rotatable drum having a portion of a peripheral surface thereof contiguous with said storage medium as said storage medium is transported therepast;
rotating said rotatable drum whereby reading means mounted on said drum traverses original azimuthal paths across said storage medium;
reading blocks including said block-identifying information recorded along at least a portion of each of said original azimuthal paths;
using said block-identifying information to determine whether any blocks expected to be read during the traversal of said original azimuthal paths were not read; and,
repositioning, in response to said determination, said reading means whereby said reading means traverses modified azimuthal paths in an attempt to read a block which should have been previously read but was not previously read, said modified azimuthal paths being offset with respect to said original azimuthal paths relative to said direction of medium travel.

8. The method of claim 7, wherein said original azimuthal paths and said modified azimuthal paths are essentially linear, with said modified azimuthal paths being essentially parallel to said original azimuthal paths.

9. The method of claim 7, wherein said modified azimuthal paths are offset with respect to said original azimuthal paths by a first predetermined distance.

10. The method of claim 7, further comprising determining whether any blocks not read during the traversal of said original azimuthal paths are read during the traversal of said modified azimuthal paths.

11. The method of claim 10, further comprising repositioning said reading means whereby said reading means traverses second modified azimuthal paths in an attempt to read a block which should have been previously read but was not previously read, said second modified azimuthal paths also being offset with respect to said original azimuthal paths, wherein said modified azimuthal paths are offset with respect to said original azimuthal paths by a first predetermined distance and wherein said second modified azimuthal paths are offset with respect to said original azimuthal paths by a second predetermined distance.

12. A method for reading information recorded on a storage medium in helical tracks, with each track comprising a plurality of blocks of data with each block having unique block-identifying information, said method comprising:
transporting said storage medium in a direction of medium travel past a rotatable drum, said rotatable drum having a portion of a peripheral surface thereof contiguous with said storage medium as said storage medium is transported therepast;
rotating said rotatable drum whereby reading means mounted on said drum traverses original azimuthal paths across said storage medium;
reading blocks including said block-identifying information recorded along at least a portion of each of said original azimuthal paths;
using said block-identifying information to determine whether any blocks expected to be read during the traversal of said original azimuthal paths were not read; and,
repositioning, in response to said determination, said reading means whereby said reading means traverses a set of modified azimuthal paths in an attempt to read a block which should have been previously read but was not previously read, said set of modified azimuthal paths being related to said original azimuthal paths relative to said direction of medium travel.

13. The method of claim 12, wherein said original azimuthal paths and each of said modified azimuthal paths included in said set are essentially linear, with each of said modified azimuthal paths being essentially parallel to said original azimuthal paths.

14. The method of claim 12, wherein for each set the modified azimuthal paths are spaced from said original azimuthal paths by a unique predetermined distance relative to the direction of medium travel.

15. The method of claim 14, wherein said unique predetermined distances from said original azimuthal paths range from a zero predetermined distance to a maximum predetermined distance, and wherein each of said predetermined distances other than said zero predetermined distance have a directional sense relative to said direction of medium travel.

16. The method of claim 15, wherein a first predetermined distance for a first modified azimuthal path is the zero predetermined distance.

17. The method of claim 16, wherein a second and third predetermined distances for second modified azimuthal paths and third modified azimuthal paths are the maximum predetermined distance, said second predetermined distance having a first directional sense and said third predetermined distance having a second directional sense.

18. The method of claim 17, wherein a fourth and fifth predetermined distance for fourth and fifth azimuthal paths are an intermediate predetermined distance, said intermediate predetermined distance being greater than said zero predetermined distance and less than said maximum predetermined distance, said fourth predetermined distance having a first directional sense and said fifth predetermined distance having a second directional sense.

19. The method of claim 12, further comprising repositioning said reading means whereby said reading means traverses a plurality of sets of modified azimuthal paths in an attempt to read a block which should have been previously read but was not previously read, each of said sets of modified azimuthal paths being related to said original azimuthal paths relative to said direction of medium travel, each of said modified azimuthal paths being offset from said original azimuthal path relative to said direction of medium travel, the degree of offset being the same for modified azimuthal paths in the same set, the degree of offset being different for differing sets.

20. Apparatus for reading information recorded on a storage medium in helical tracks, with each track comprising a plurality of blocks of data with each block having unique block-identifying information, said apparatus including means for transporting said storage medium in a read direction and in a backward direction opposite to said read direction; a rotatable drum having a portion of a peripheral surface thereof contiguous with said storage medium as said storage medium is transported therepast by said transporting means; reading means mounted on said drum for traversing a set of original azimuthal paths across said storage medium and for attempting to read blocks including said block-identifying information recorded along at least a portion of each of said original azimuthal paths; and, positioning means mounted on said drum for selectively repositioning said reading means; wherein the improvement comprises:

control means for using said block-identifying information to determine whether any blocks expected to be read during the traversal of said set of original azimuthal paths were not read and therefore are missing blocks; for directing said transporting means to transport said storage medium a predetermined distance in said backward direction upon the determination that blocks are missing; for applying a signal in accordance with said determination to said positioning means whereby, as a portion of said storage medium is re-read in attempt to read missing blocks, said reading means can traverse a first set of modified azimuthal paths, with each of said modified azimuthal paths of said first set being offset by a first offset degree from its corresponding original azimuthal path; for determining whether all missing blocks were read by said reading means traversing said first set of modified azimuthal paths; and, for directing continued reading of said storage medium with said reading means at said first offset degree if all of said missing blocks were read as reading means traversed said first set of modified azimuthal paths.

21. The apparatus of claim 20, wherein said control means directs continued reading of said storage medium with said reading means at said first offset degree until said control means determines that blocks expected to be read were not read.

22. The apparatus of claim 20, wherein, if all of said missing blocks were not read as said reading means traversed said first set of modified azimuthal paths, said control means directs said transporting means to transport said storage medium a predetermined distance in said backward direction and applies a signal to said positioning means whereby, as a portion of said storage medium is re-read in attempt to read missing blocks, said reading means can traverse second modified azimuthal paths, said second modified azimuthal paths being offset by a second offset degree from said original azimuthal paths.

23. A method for reading information recorded on a storage medium in helical tracks, with each track comprising a plurality of blocks of data with each block having unique block-identifying information, said method comprising:
(1) transporting said storage medium in a read direction past a rotatable drum, said rotatable drum having a portion of a peripheral surface thereof contiguous with said storage medium as said storage medium is transported therepast;
(2) rotating said rotatable drum whereby reading means mounted on said drum traverses original azimuthal paths across said storage medium;
(3) reading blocks including said block-identifying information recorded along at least a portion of each of said original azimuthal paths;
(4) using said block-identifying information from blocks read during step (3) to determine whether any blocks expected to be read during the traversal of said original azimuthal paths were not read and therefore are missing blocks;
(5) transporting said storage medium a predetermined distance in a direction which is the reverse of said read direction;
(6) using said determination of step (4) to cause said reading means to traverse a first set of modified azimuthal paths offset by a first offset degree from said original azimuthal paths, said first modified azimuthal paths being offset with respect to said original azimuth paths relative to said direction of medium travel;
(7) reading blocks including said block-identifying information recorded along at least a portion of each of said modified azimuthal paths included in said first set of modified azimuthal paths;
(8) using said block-identifying information from blocks read during step (7) to determine whether any blocks expected to have already been read were not read and therefore are still missing blocks;
(9) continuing to read said storage medium with said reading means at said first offset degree if it were determined at step (8) that all of said missing blocks were read as reading means traversed said first set of modified azimuthal paths.

24. The method of claim 23, wherein said reading of step (10) with said reading means at said first degree of offset continues until a determination is made that blocks expected to be read were not read.

25. The method of claim 23, further comprising:
(11) determining if all missing blocks have been read;
(12) transporting said storage medium a predetermined distance in a direction which is the reverse of said read direction;
(13) causing said reading means to traverse a set of modified azimuthal paths offset from corresponding original azimuthal paths by an offset degree which differs from a degree of offset of any previous set of modified azimuthal paths; and,
(14) reading blocks including said block-identifying information recorded along at least a portion of each of the modified azimuthal paths included in the set of step (13).

26. The method of claim 25, further comprising repeating steps (11) through (14) whereby for each repetition of steps (11) through (14) a unique set of modified azimuthal paths is traversed.

27. Apparatus for reading information recorded on a storage medium in helical tracks, with each track comprising a plurality of blocks of data with each block having unique block-identifying information, said apparatus including means for transporting said storage medium in a read direction and in a backward direction opposite to said read direction; a rotatable drum having a portion of a peripheral surface thereof contiguous with said storage medium as said storage medium is transported therepast by said transporting means; reading means mounted on said drum for traversing original azimuthal paths across said storage medium and for attempting to read blocks including said block-identifying information recorded along at least a portion of each of said original azimuthal paths; and, positioning means mounted on said drum for selectively repositioning said reading means;

wherein the improvement comprises:
control means for using said block-identifying information to determine whether any blocks expected to be read during the traversal of said original azimuthal paths were not read and therefore are missing blocks; for directing said transporting means to transport said storage medium a predetermined distance in said backward direction upon the determination that blocks are missing; for using information derived from said block-identifying information to select from a plurality of potential offset positions for said reading means whereby for each offset position said reading means traverses unique sets of modified azimuthal paths in an attempt to re-read missing blocks, said offset positions of differing sets being separated by a unique offset distance from said original azimuthal paths relative to said direction of medium travel.

28. The apparatus of claim 27, wherein said control means selects from among said plurality of offset positions for said reading means by determining a utilization sequence of said offset positions using said information derived from said block-identifying information.

29. The apparatus of claim 28, wherein said utilization sequence is determined on the basis of the number of previously missing blocks successfully read for each of said offset positions.

30. The apparatus of claim 27, wherein said original azimuthal paths and said modified azimuthal paths are essentially linear, with said modified azimuthal paths being essentially parallel to said original azimuthal paths.

31. A method for reading information recorded on a storage medium in helical tracks, with each track comprising a plurality of blocks of data with each block having unique block-identifying information, said method comprising:
(1) transporting said storage medium in a read direction past a rotatable drum, said rotatable drum having a portion of a peripheral surface thereof contiguous with said storage medium as said storage medium is transported therepast;
(2) rotating said rotatable drum whereby reading means mounted on said drum traverses original azimuthal paths across said storage medium;
(3) reading blocks including said block-identifying information recorded along at least a portion of each of said original azimuthal paths;
(4) using said block-identifying information from blocks read during step (3) to determine whether any blocks expected to be read during the traversal of said original azimuthal paths were not read and therefore are missing blocks;
(5) transporting said storage medium a predetermined distance in a direction which is the reverse of said read direction;
(6) using information derived from said block-identifying information to select from a plurality of potential offset positions for said reading means; and,
(7) repositioning said reading means at said selected offset position whereby said reading means traverses a set of modified azimuthal paths in an attempt to re-read missing blocks.

32. The method of claim 31, wherein said selection from among said plurality of offset positions for said reading means occurs by determining a utilization sequence of said offset positions using said information derived from said block-identifying information.

33. The method of claim 32, wherein said utilization sequence is determined on the basis of the number of previously missing blocks successfully read for each of said offset positions.

34. The method of claim 31, wherein said original azimuthal paths and said modified azimuthal paths are essentially linear, with said modified azimuthal paths being essentially parallel to said original azimuthal paths.

* * * * *